(12) United States Patent
Fujiwara et al.

(10) Patent No.: US 6,798,917 B2
(45) Date of Patent: Sep. 28, 2004

(54) IMAGE INPUT APPARATUS, IMAGE PROCESSING APPARATUS, IMAGE INPUT METHOD, IMAGE PROCESSING METHOD AND IMAGE INPUT SYSTEM

(75) Inventors: Hideyuki Fujiwara, Yokohama (JP); Yuichi Sato, Yokohama (JP); Kenichi Nagasawa, Amsterdam (NL)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 09/767,867

(22) Filed: Jan. 24, 2001

(65) Prior Publication Data

US 2001/0031093 A1 Oct. 18, 2001

(30) Foreign Application Priority Data

Jan. 25, 2000 (JP) .......................................... 2000-015714
Nov. 28, 2000 (JP) .......................................... 2000-361207

(51) Int. Cl.[7] ................................................ G06K 9/36
(52) U.S. Cl. ........................ 382/240; 382/239; 382/251
(58) Field of Search ................................. 382/240, 248, 382/166, 239, 251; 710/33; 709/247; 548/385.1; 375/240.03; 341/67

(56) References Cited

U.S. PATENT DOCUMENTS

| 5,325,374 | A | | 6/1994 | Hoshi et al. ................... 371/43 |
|---|---|---|---|---|
| 5,333,013 | A | | 7/1994 | Enari et al. .................. 348/405 |
| 5,446,744 | A | | 8/1995 | Nagasawa et al. ......... 371/37.4 |
| 5,452,007 | A | | 9/1995 | Enari et al. .................. 348/405 |
| 5,812,788 | A | * | 9/1998 | Agarwal ...................... 709/247 |
| 5,930,526 | A | * | 7/1999 | Iverson ......................... 710/33 |
| 6,141,445 | A | * | 10/2000 | Castelli et al. .............. 382/232 |
| 6,259,819 | B1 | * | 7/2001 | Andrew et al. ............. 382/248 |

* cited by examiner

*Primary Examiner*—Anh Hong Do
(74) *Attorney, Agent, or Firm*—Fitzpatrick, Cella, Harper & Scinto

(57) ABSTRACT

The invention provides an encoding method applicable to the sub band encoding of an image of any resolution or size. For example, by designating the resolution or size of an input digital image and determining the number of levels of the sub band encoding according to thus designated resolution or size, the decoding can be easily achieved to provide an image which is not much different in resolution or in size.

33 Claims, 17 Drawing Sheets

FIG. 13

| | | | | | | | | |
|---|---|---|---|---|---|---|---|---|
|(J)| LINE1 | LINE2 | LINE3 | LINE4 | LINE5 | LINE6 | LINE7 | LINE8 | LINE9 |
|(K)| | LINE1 | LINE2 | LINE3 | LINE4 | LINE5 | LINE6 | LINE7 | LINE8 |
|(M)| | | LINE1 | LINE2 | LINE3 | LINE4 | LINE5 | LINE6 | LINE7 |
|(N)| | | H-LINE2 | | H-LINE4 | | H-LINE6 | | H-LINE8 |
|(P)| | | | | H-LINE2 | | H-LINE4 | | H-LINE6 |
|(Q)| | | | | L-LINE3 | | L-LINE5 | | L-LINE7 |
|(R)| | | | H-LINE2 | | H-LINE4 | | H-LINE6 | |
|(S)| | | | L-LINE3 | | L-LINE5 | | L-LINE7 | |

FIG. 15

| 331 332 333 | 421 | 422 | 423 | 401 | 402 | 403 | 411 | 412 | 413 | 433 434 |
|---|---|---|---|---|---|---|---|---|---|---|
| A | CK1 | Y | Y | Y | CK1 CK2 | CK3 CK4 | CK5 CK6 | CK2 CK3 | CK4 CK5 | CK6 CK7 | CK7 |
| 1B, 2B | CK2 | X | Y | Y | | CK2 CK3 | CK4 CK5 | | CK3 CK4 | CK5 CK6 | CK6 |
| 1C, 2C | CK3 | — | X | Y | | | CK3 CK4 | | | CK4 CK5 | CK5 |
| D | CK4 | — | — | X | | | | | | | CK4 |

|  | 421 | 422 | 423 |
|---|---|---|---|
| MODE I | Y | Y | Y |
| MODE II | X | Y | Y |
| MODE III | — | X | Y |
| MODE IV | — | — | X |

IMAGE INPUT APPARATUS, IMAGE PROCESSING APPARATUS, IMAGE INPUT METHOD, IMAGE PROCESSING METHOD AND IMAGE INPUT SYSTEM

BACKGROUND OF THE INVENTION

1. Field of the Invention

The present invention relates to an image input apparatus, an image processing apparatus, an image input method, an image processing method and an image input system, and more particularly to an image input apparatus and an image input system having an image compressing function.

2. Related Background Art

FIG. 18 is a view schematically showing a conventional image reading system, wherein a host computer (hereinafter simply called host) 11' is loaded with a scanner driver for driving an image scanner (hereinafter simply called scanner) constituting an image reading apparatus, and with various application softwares. A scanner 12' under the control of the scanner driver converts an optical image into an electrical signal, then digitizes the signal by an unrepresented A/D (analog-to-digital) converter followed by image processing, and transfers the signal through a predetermined interface (e.g., SCSI or USB) to the host computer 11'.

On the other hand, owing to the recent progress in the high efficiency image encoding technology, the image information is commonly compressed in storage by a host computer or a personal computer (PC).

However, the scanners are becoming capable of reading the image with a high resolution such as 1200 dpi (dpi=dots per inch), resulting in an enormous amount of information to be transferred to the host computer with a long transfer time, leading to deterioration of convenience for the user.

It is therefore conceivable to transfer the image, compressed in the scanner, to the computer, but it is necessary to consider convenience of handling in the scanner and in the computer. Particularly in case of sub-band encoding such as discrete wavelet transformation, it is necessary, depending on the depth of level of sub-band encoding, to determine each time the level of decoding when an image of a certain size and a certain resolution is required in the host computer or in the scanner, so that the handling is rather difficult.

Also in executing such sub-band encoding, the high efficiency encoding itself of the image may become unable to improve the compression rate or may result in a deterioration of the image even if the number of sub-band levels is increased, if the sub-band encoding is executed uniformly to a certain predetermined level.

SUMMARY OF THE INVENTION

In consideration of the foregoing, the object of the present is to provide an image input apparatus, an image processing apparatus etc. allowing to improve the convenience of handling of the image data after the sub-band encoding.

The above-described object can be attained, according to a preferred embodiment of the present invention, namely an image input apparatus comprising: a photoelectric conversion means for converting an optical image into a digital image; an encoding means for sub band encoding the digital image; a designation means for designating the resolution of the digital image; and a control means for determining the number of levels of the sub band encoding according to the designated resolution.

The above-described object can be also attained, according to a preferred embodiment of the present invention, namely an image input apparatus comprising: a photoelectric conversion means for converting an optical image into a digital image; an encoding means for sub band encoding the digital image; a designation means for designating the size of the input optical image; and a control means for determining the number of levels of the sub band encoding according to the designated size.

The above-described configurations allow, in inputting an image of any resolution, to easily decode the sub-band encoded image to obtain an image not much different in resolution, whereby the handling of the image signal after encoding can be facilitated.

Other objects of the present invention, and the features thereof, will become fully apparent from the following description of embodiments, to be taken in conjunction with the accompanying drawings.

BRIEF DESCRIPTION OF THE DRAWINGS

FIG. 13 is a timing chart showing the function timing of the circuit shown in FIG. 12;

FIG. 15 is a view showing clock signals employed in the operation modes in various units of the encoding circuit shown in FIG. 9;

DESCRIPTION OF THE PREFERRED EMBODIMENTS

Hereinafter, the present invention will be explained in detail by the preferred embodiments thereof.

Figure 1:
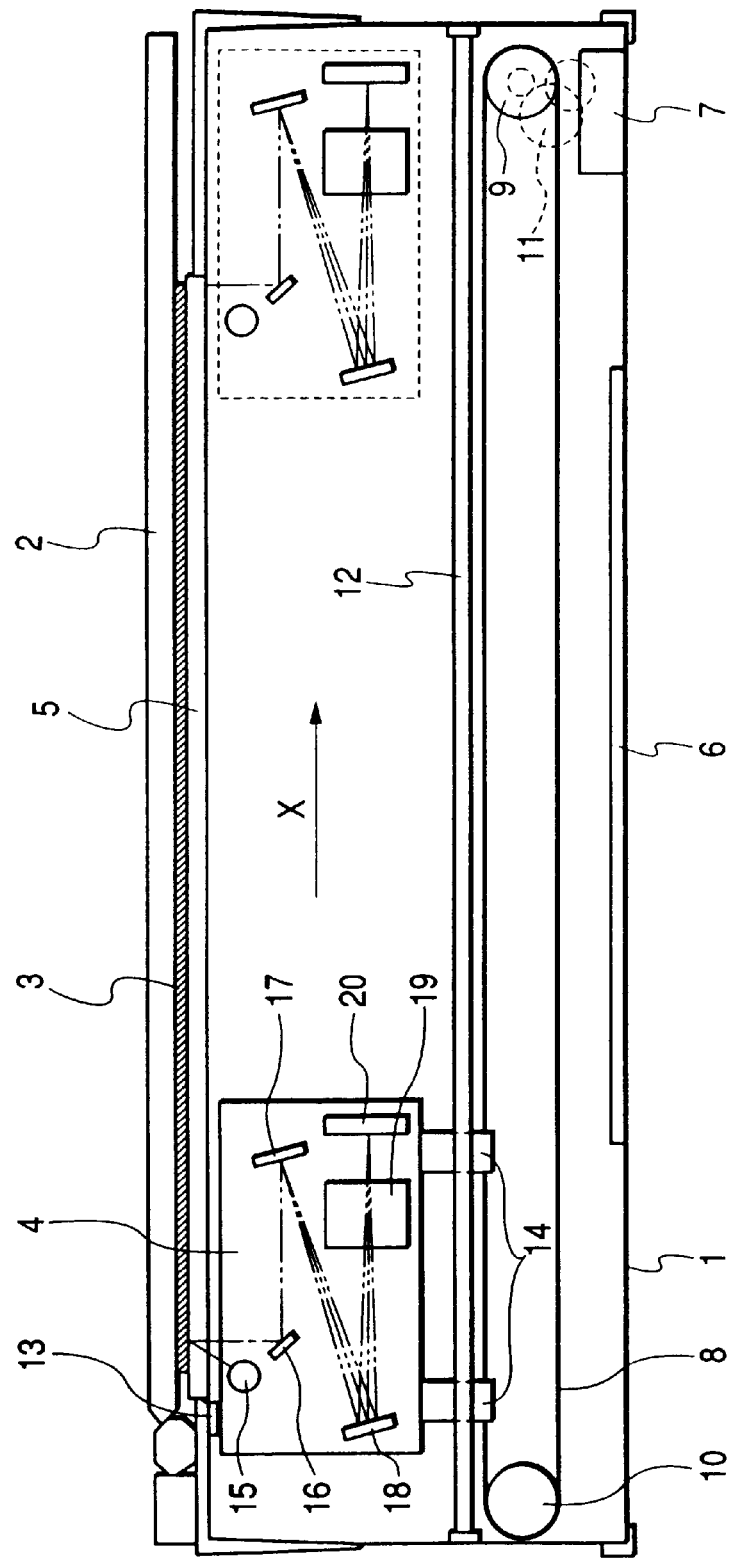
FIG. 1 is a cross-sectional view of an image input apparatus (scanner) embodying the present invention.

FIG. 1 is a cross-sectional view of an example of the image reading apparatus, to be employed in the image reading system of the present invention.

Referring to FIG. 1, there are shown a main body 1 of the scanner, an original pressing plate 2, and an original 3 to be read. The scanner 1 is connected by an unrepresented interface cable to a host. The scanner 1 is provided with a movable optical unit 4, an original supporting glass plate 5, an electric board or substrate 6, a stepping motor 7, an endless belt 8, pulleys 9, 10, a gear train 11, a guide rail 12, and a standard white board 13. The optical unit 4 and the stepping motor 7 are electrically connected respectively to the electrical substrate 6 by unrepresented cables.

The optical unit 4 is supported by support means 14 slidably with respect to the guide rail 12. The support means 14 is fixed to the endless belt 8. The movable optical unit 14 is composed of a light source 15, plural mirrors 16, 17, 18, an imaging lens 19 and a line sensor 20 constituting image pickup means.

There will be briefly explained the original image reading operation of the scanner 1. The reading operation in the scanner 1 is started by a reading command from the host. The scanner 1 turns on the light source 15 of the optical unit 4, and the reflected light is reflected through the plural mirrors 16, 17, 18 and is focused through the imaging lens 19 onto the sensor 20, whereby the image of a line in the main scanning direction is read. Also the stepping motor 7 is powered to rotate the pulley 9 through the gear train 11 thereby driving the endless belt 8.

Thus the optical unit 4, fixed to the endless belt 8 by the support means 14, moves on the guide rail in the sub scanning direction indicated by X. The scanner 1 repeats the above-described reading of the line image in the main scanning direction, while moving the optical unit 4 in the sub scanning direction. The scanner 1 can scan the entire area of the original supporting glass, by moving the optical unit 4 in such image reading operation to a broken-lined position shown in FIG. 1. However, it is also possible to read a partial image of the original placed on the original supporting glass, according to the reading command from the host. Such reading can be realized by defining the image reading area, designated by the host, in the main scanning direction by the range of pixels to be adopted within the output of the sensor and in the sub scanning direction by the movable range of the optical unit through unrepresented control means on the electrical substrate 6, namely a system controller composed for example of a CPU as will be explained later.

Figure 2:
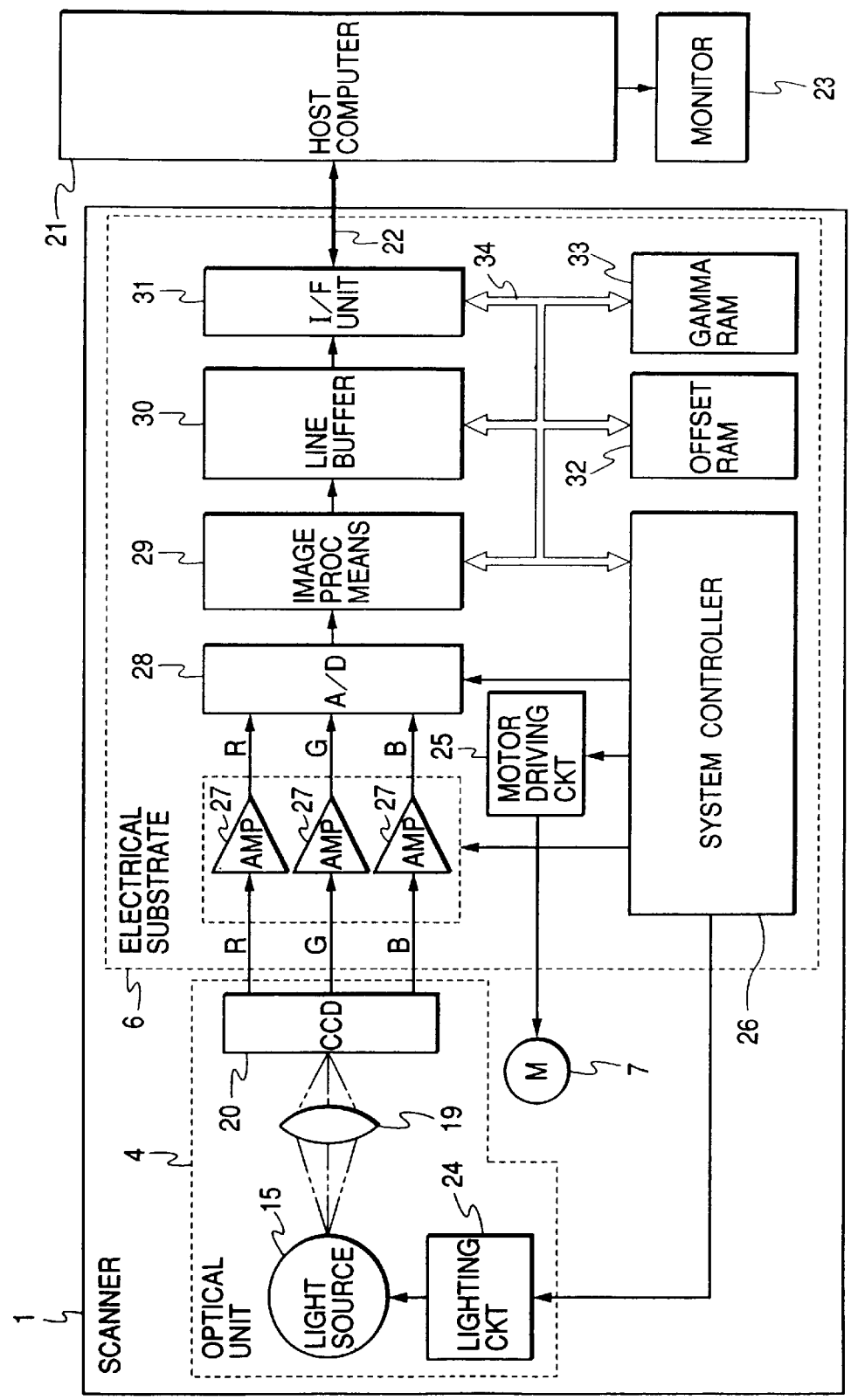
FIG. 2 is a block diagram showing the configuration of an image input system embodying the present invention.

FIG. 2 is a functional block diagram of an image reading system of the present invention, wherein components equivalent to those in FIG. 1 are represented by corresponding numbers and will not be explained further. The present image reading system is composed of a scanner 1 and a host 21. The scanner 1 and the host 21 are mutually connected by an interface cable, for example a well known SCSI bus 22. The host 21 is provided with a monitor 23, and the operator executes the image reading operation while looking at the monitor 23 and confirms the result of image reading by the monitor 23.

Hereinafter, there will be explained each functional block with reference to FIG. 2.

The optical unit 4 is provided with a light source lighting circuit 24 which turns on the light source 15 and is composed of so-called inverter circuit in case the light source 15 is composed of a cold cathode tube. The electrical substrate 6 is provided with a motor driving circuit 25 for driving the stepping motor 7 by outputting magnetization switching signals therefor in response to a signal from a system controller 26, which is the system control means of the scanner 1. Analog gain controllers 27R, 27G, 27B are rendered capable of variably amplifying the analog image signals output from the line sensor 20. An A/D converter 28 converts the analog image signal output from the analog variable gain controllers 27 into a digital image signal. Image process means 29 executes, on the digitized image signal, image processing such as offset correction, shading correction, digital gain control, color balance adjustment, masking and image compression by converting the resolution in the main and sub scanning directions.

A line buffer 30 for temporarily storing the image data is composed of an ordinary random access memory. An interface unit 31 is used for communication with the host 21. In the present embodiment, it is composed of a SCSI controller, but it may also be composed of other interfaces such as Centronics or USB. An offset RAM 32 is used as a working area in the image processing. In the line sensor 20, the R, G and B line sensors are positioned mutually parallel with certain offsets therebetween, and the offset RAM 32 is used for correcting the offset values between the R, G and B lines. The offset RAM 32 is also used for temporary storage of various data for example in the shading correction. In the present embodiment, it is composed of an ordinary random access memory. A gamma RAM 33 stores gamma correction curves for gamma correction.

A system controller 26, provided with a ROOM storing the operation sequence of the CPU and the scanner, executes various controls according to the commands from the host 21. A system bus (CPU bus) 34 connects the system controller 26, the image process means 29, the line buffer 30, and the interface unit 31, the offset RAM 32 and the gamma RAM 33 and is composed of an address bus and a data bus.

Figure 3:
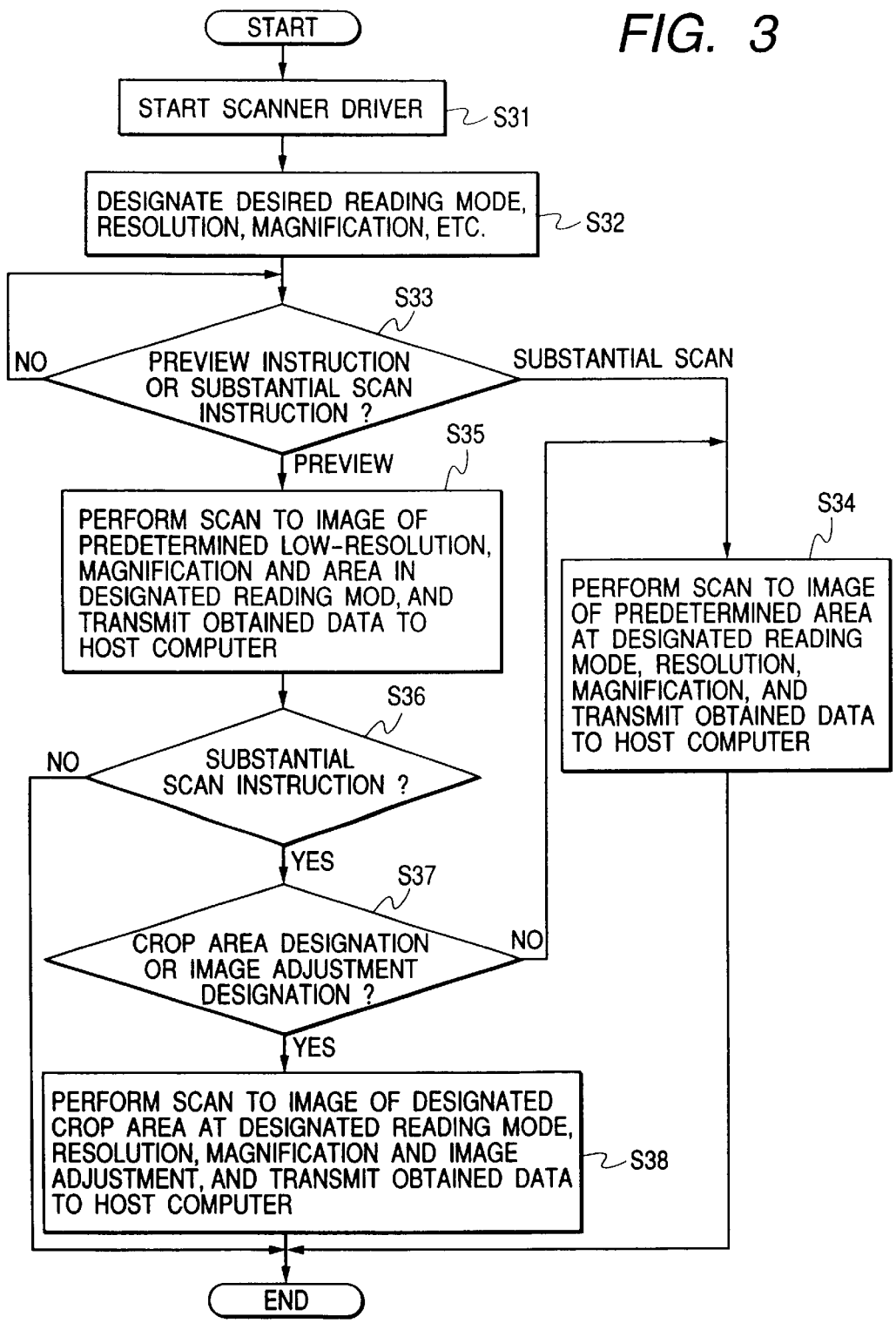
FIG. 3 is a flow chart showing the basic function of the image input system shown in FIG. 2.

FIG. 3 is a flow chart showing the basic functions of the image input system of the present invention, wherein bold frames indicate the operations of the scanner 1.

First, the operator lifts the original pressing plate 2 of the scanner 1 and places an original to be read, with the surface to be read downwards, on the original supporting glass 5. In this state, the operator activates the scanner driver as one of the applications on the host 21 (S31). The scanner driver may be activated directly or through TWAIN from an application software such as Photoretouch.

Then, the operator inputs, on an input image provided by the scanner driver, the desired reading conditions such as the reading mode (e.g., color, gray scale, binary etc.), resolution (e.g., 600 dpi, 300 dpi etc.), and magnification (e.g., 200%, 100%, 50% etc.) (S32). The data of these reading conditions are temporarily stored in an unrepresented memory in the host 21.

Then, the operator provides an instruction for the preview or for the substantial scan, and the scanner driver discriminates whether the instruction for the preview or the substantial scan has been given.

In case of detecting the instruction for the substantial scan in a step S33, the scanner driver transmits the set parameters to the scanner 1 through the interface, thereby instructing the reading conditions such as the reading mode, resolution and magnification designated by the operator in the step S32. Together with the setting of the reading conditions, the scanner driver sets the reading area, but, as the operator has not designated the reading area at this point, there are designated parameters for scanning the substantially entire area of the original supporting glass. The scanner driver, after instructing the aforementioned reading conditions to the scanner 1, transmits a command instructing the start of the actual scanning operation.

Also in case the scanner driver detects the instruction for the preview in the step S33, the scanner driver instructs, to the scanner 1 through the interface, the reading mode designated by the operator in the step S32, a predetermined low resolution (e.g., 75 dpi), a predetermined magnification, and predetermined parameters for scanning the substantially entire area of the original supporting glass, and then transmits a command for instructing the start of the actual scanning operation. In case of previewing, the parameters are always so set as to read the substantially entire area.

Upon detecting the instruction for the substantial scanning in S33, the scanner driver sends the parameters indicating the aforementioned reading conditions to the scanner 1, thereby instructing the start of the scanning operation. The aforementioned reading conditions are received by the scanner 1 through the interface circuit 31 and interpreted by the system controller, and set as parameters in the various units for example of the image processing means 29. Then, the system controller 26 turns on the light source 15, activates the motor 7 and checks the output of the CCD, thereby executing calibration control including the confirmation of stability of the light source, preparation of the shading data and detection of the reading reference position. Thereafter the scanner 1 scans the original under the control of the system controller 26, and transmits the scanned image data to the host 21 (S34) after data compression as will be explained later.

Also upon detecting the instruction for the preview in S33, the scanner driver of the host 21 scans the original in a similar manner as in the step S34 but employing the reading parameters different from those of the substantial scanning operation, and transmits the scanned image data to the host 21 (S35).

The scanner driver of the host 21 displays the scanned image, transmitted from the scanner 1, on the monitor 23. The image thus displayed is a preview image obtained by reading the substantially entire area of the original supporting glass with the aforementioned low resolution. The operator confirms, on the monitor, such preview image provided by the scanner driver. Also the operator can designate a necessary area, in the preview image, by a frame, or apply image adjustment (e.g., correction of the gamma curve) for obtaining a desired image. The data of such area designation and image adjustment are stored in a temporary memory of the host 21.

After the display of the preview image, the scanner driver provides the operator with the above-described functions of area designation and image adjustment, and discriminates whether the substantial scanning is instructed from the operator (S36). In case the substantial scanning is instructed in the step S36, the scanner driver checks whether the aforementioned data for area designation and image adjustment are present (S37). If the scanner driver judges, in S37, that the area designation or image adjustment after the previewing does not exist, there is executed a process similar to the designation of the substantial scanning in S33 and the process of S34 by the scanner 1.

In case the scanner driver detects the area designation and/or the image adjustment after previewing in the step S37, the scanner driver instructs, in a step S38, the setting of the reading conditions such as reading mode, resolution, magnification, reading area and image adjustment, designated by the operator in the step S32, to the scanner 1 through the interface by transmitting parameters thereto. After instructing the setting parameters of the reading conditions to the scanner 1, the scanner driver transmits a command instructing the start of the actual scanning operation.

The system controller 26 of the scanner 1 reads the image by controlling various units, based on the parameters received through the interface circuit. The area designated by the above-described area designation can be managed, based on an original point constituted by a home position mark provided on the rear surface of the standard white board 13, by an area on the original supporting glass 5 defined by the pixel position in the main scanning direction and the number of lines in the sub scanning direction. Also the image adjustment can be achieved by writing data of the gamma correction curve in the gamma RAM and utilizing such data by the image process means to be explained later.

Figure 4:
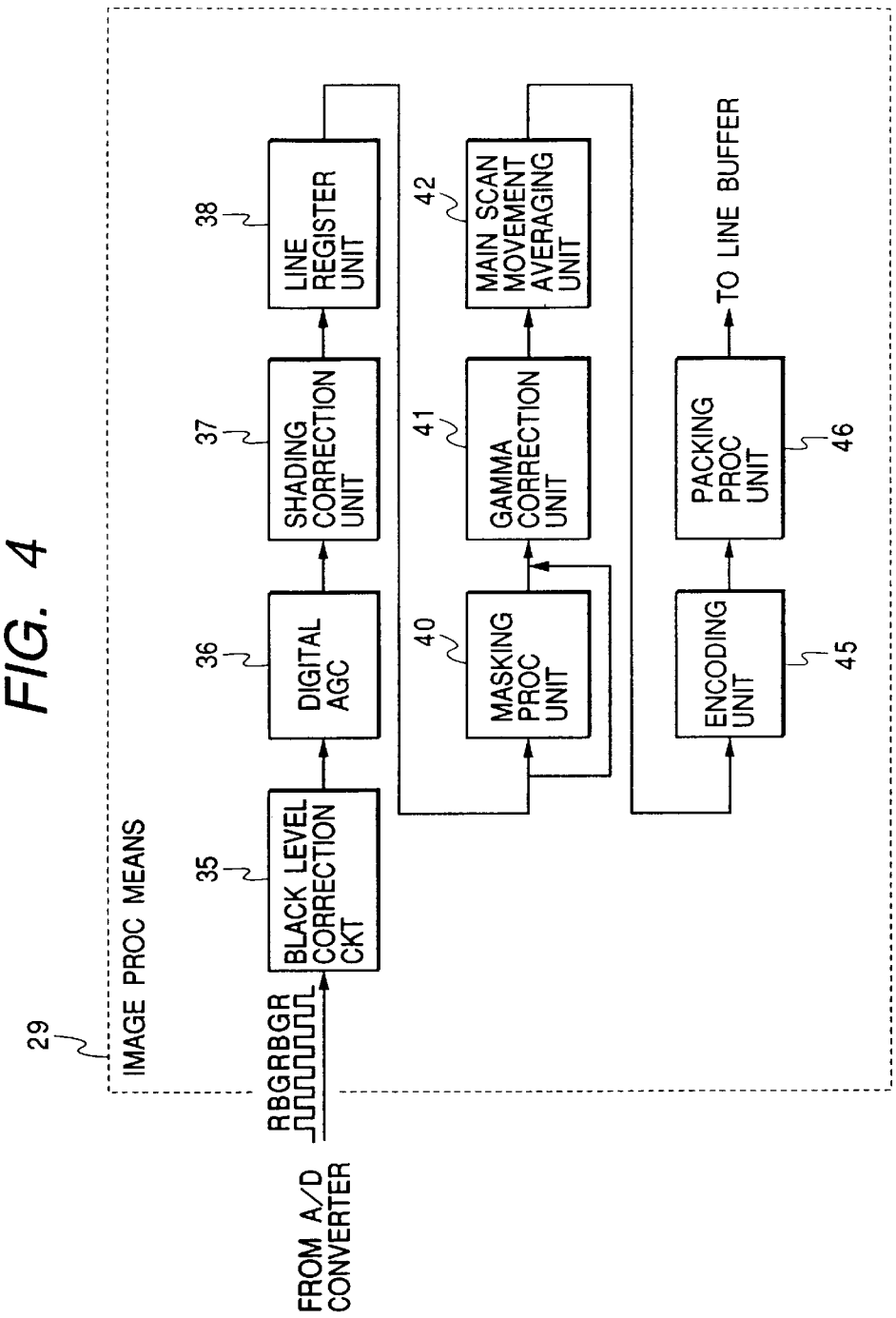
FIG. 4 is a block diagram showing the function of image processing means shown in FIG. 2.

FIG. 4 is an internal functional block diagram of the image process means 29, including an encoding unit featuring the present invention. Hereinafter, there will be explained the functions. The A/D converter 28 shown in FIG. 2 converts the output of the analog variable gain controllers 27R, 27G, 27B, receiving the RGB outputs of the CCD sensor under the control by the system controller 26, into dot-sequential signals in which the R, G, B color signals are multiplexed on time-shared basis, and then executes conversion into digital signals. The image signal thus digitized is supplied to a black level correction circuit 35, which adjust the black level of the input image signal by subtracting a digitized value of the output signal from an OB (optical black) area from the input image signal. The input image signal after the black level correction is supplied to a digital AGC (automatic gain controller) 36 and is digitally multiplied therein by a value of ½ to 1 whereby the levels of the R, G, B colors are matched. Thereafter the input image signal is input into a shading correction unit 37.

The shading correction unit 37 employs shading data, which are acquired by the scanner by reading a standard white board at the calibration. The shading data are stored in the offset RAM 32 at the calibration. Thus, there can be prepared a signal which is corrected for the signal distortion in the main scanning direction, resulting from the individual difference in the light source or in the sensor element. The input image signal after the shading correction is supplied to a line register unit 38, which executes positional alignment of the R, G, B image signals. In the configuration utilizing the 3-line CCD sensor 20 and the mirrors 16, 17, 18, the R, G, B line sensors cannot read a same position at the same time, since they are positioned with a mutual offset of several lines. The line register unit 38 executes digital register of the signals. As an example, in case the R, G, B line sensors of the CCD sensor 20 have a resolution of 600 dpi and an offset of 8 lines and read the image in the order of R, G and B, the R signals of 16 lines and the G signals of 8 lines are delayed by storage in and read-out from the offset RAM, thereby being aligned with the B image signals. Stated differently, the R and G image signals on a line same as that of the current B image signals are respectively read earlier by 16 lines and 8 lines.

Then, according to the designated resolution and magnification, the system controller 26 controls a motor driving circuit 25 and the stepping motor 7 thereby varying the moving speed of the optical unit 4 in the sub scanning direction. The moving speed in the sub scanning direction can ba altered for example by increasing or decreasing the number of pulses supplied to the stepping motor 7 within a line synchronization signal (Hsync). For example, if 4 pulses per an Hsync signal are employed for 600 dpi/100%, there may be employed 8 pulses per an Hsync signal for 300 dpi/100% for doubling the moving speed and halving the number of sample lines.

In the system of the present scanner 1, the moving speed is set at discrete values of 4 pulses (600 dpi/100%), 8 pulses (300 dpi/100%), 16 pulses (150 dpi/100%) and 32 pulses (75 dpi/100%). Also the system controller 26 executes the optimum control, according to the designation of the resolution and the magnification. For example, if there are designated a resolution of 300 dpi and a magnification of 200%, the system controller 26 executes control for an operation corresponding to 600 dpi/100%. The number of the offset lines matched by the aforementioned line register unit 38 is also switched according to the moving speed. For example, for a resolution of 300 dpi, the R signal of 8 lines and the G signal of 4 lines are respectively delayed by storage in and readout from the offset RAM 32. Also, for a resolution of 150 dpi, the R signal of 4 lines and the G signal of 2 lines are respectively delayed by storage in and readout from the offset RAM 32. As explained in the foregoing, the conversion of the resolution and magnification in the sub scanning direction can be achieved by the speed control of the motor 7 and the readout address control of the RAM.

The image signals thus subjected to the conversion of resolution and magnification in the sub scanning direction and to the line register are supplied to a masking process unit 40, which brings the respective color signals to the ideal values by employing filter correction coefficients, matching the filters of the respective colors of the CCD sensor and adapted to eliminate the influence of the light of unnecessary wavelength within the light input through the filters of the CCD. This process is bypassed in case the reading mode is either gray scale or binary, and the image signals are directly input into a next gamma correction unit 41.

The gamma correction unit 41 executes gamma correction on the input image signals. The parameters of the gamma correction curve of the image adjustment designated by the operator on the scanner driver are transmitted from the host 21 to the scanner 1 prior to the image scanning, and the system controller writes such parameters as the gamma correction curve into the gamma RAM 33. The value of the digitized image signal is directly input as the address of the RAM, and is converted into a value stored at such address. In case the host 21 executes no adjustment, the gamma correction curve becomes a through pattern, whereby the gradation and the density are not altered. The gradation can be reduced by defining the gradation with the input of 12 bits and the output of 8 bits in the gamma correction curve, and the gradation is not altered if the through mode is selected.

The image signals output from the gamma correction unit 41 are supplied to a main scan movement averaging unit 42, which executes thinning or interpolation of the pixels relating to the conversion of the resolution and magnification in the main scanning direction. For example, if the CCD sensor 20 has pixels corresponding to 600 dpi and if the resolution is converted to 300 dpi, data of a pixel is obtained by averaging the data of adjacent two pixels of 600 dpi. Also image expansion is executed by forming an interpolating pixel by averaging the adjacent two pixels. The main scan movement averaging unit 42 executes the conversion of resolution and magnification in the main scanning direction for 2, ½, ¼ or ⅛ times.

Also the main scan movement averaging unit 42 has a function of extracting the pixels values of a necessary range only within the output of the respective lines of the CCD sensor having pixels corresponding to 600 dpi and outputting the extracted pixel values only with a uniform time interval. For example, in case of reading an original of a size of ¼ of the predetermined size, the number of pixels in each line becomes a half, corresponding to a number of pixels of a resolution of 300 dpi, and the values of such pixels are output with a uniform time interval equal to that in case of image reading with 300 dpi.

The image signals thus subjected to the conversion of the resolution and magnification in the main scanning direction are supplied to an encoding unit 45, and are subjected therein to an encoding process for the image compression to be explained later. However, the 8-bit gray scale image signals or the binarized image signals of a low data amount are subjected only to an entropy encoding in the encoding unit 45 and are supplied to a succeeding packing process unit 46.

The packing process unit 46 executes a packing process on the image data in the unit of 8 bits, such as packing of 8 pixels of the binary image signals or division of the 12-bit image data into 8 bits and 4 bits+4-bit dummy data, and outputs the processed data to a line buffer 30.

Figure 5:
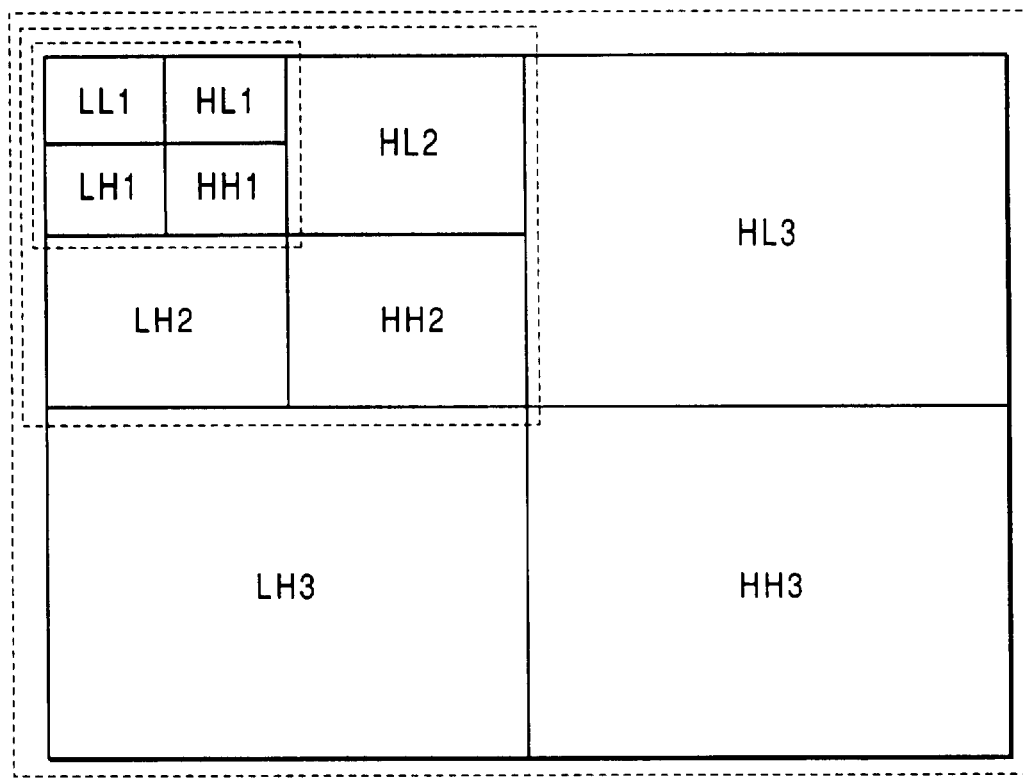
FIG. 5 is a view schematically showing the data of sub-bands of an image subjected to discrete wavelet transformation in an embodiment of the present invention.

Hereinafter, there will be explained the configuration of the encoding unit 45 in the present embodiment. The encoding unit 45 of the present embodiment is capable of two-dimensional discrete wavelet transformation (hereinafter simply represented as DWT) of 3 levels at maximum, as shown in FIG. 5. As already well known, the two-dimensional DWT of multiple levels can be achieved by repeating the two-dimensional DWT, taking the low-pass coefficients (hereinafter simply represented as LL) of a two-dimensional DWT in the vertical and horizontal directions as the object of a next two-dimensional DWT. Similarly, in the present specification, the horizontal low-pass and vertical high-pass coefficients will be represented as LH, while the horizontal high-pass and vertical low-pass coefficients will be represented as HL, and the high-pass coefficient in the horizontal and vertical directions will be represented as HH.

In the present example, the LL obtained in the DWT of the final level is represented as LL1, and LH, HL, HH obtained similarly in the DWT of the final level are respectively represented as LH1, HL1, HH1. Also the LL, LH, HL, HH obtained in the DWT of a level prior to the final level are represented as LL2, LH2, HL2, HH2, and those obtained in the DWT of a preceding level (initial level in case of three levels) are represented respectively as LL3, LH3, HL3, HH3.

Figure 6:
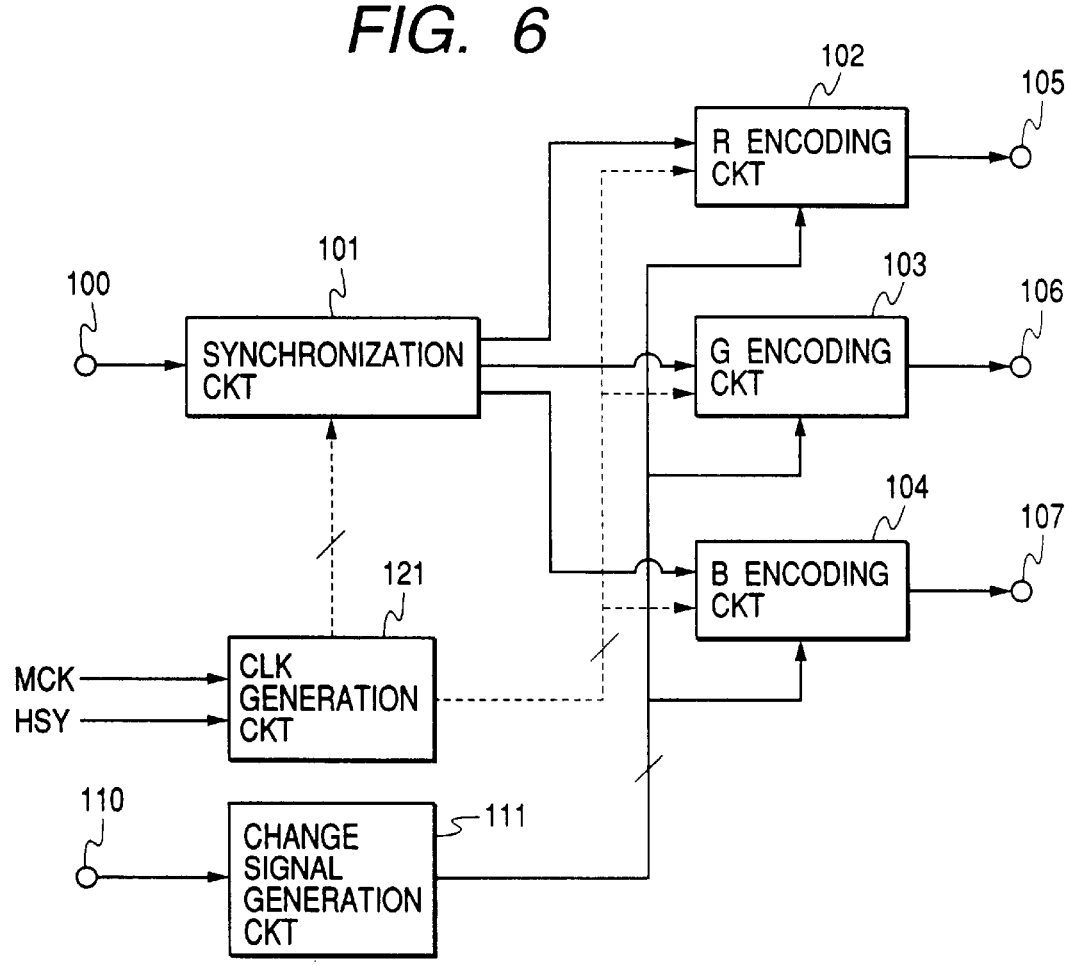
FIG. 6 is a block diagram schematically showing the configuration of an encoding unit in an embodiment of the present invention.

FIG. 6 is a block diagram schematically sowing the configuration of the encoding unit in the present embodiment. As explained in the foregoing, the scanned color image signals are obtained, after the conversion of the resolution and magnification in the horizontal and vertical directions (main and sub scanning directions), as dot-sequential signals of three colors. Such dot-sequential signals are input into a terminal 100 and supplied to a synchronization circuit 101. A master clock signal MCK, corresponding to the input frequency of the all the samples of the above-described dot-sequential signals in case the scanner 1 outputs an image of 600 dpi, and a horizontal scan synchronization signal HSY are input into a clock generation circuit 121, which generates various clock signals to be utilized in encoding circuits 102 to 104 to be explained later.

On the other hand, with the operation of the scanner 1, the signals indicating the operation mode thereof, namely the aforementioned parameters from the system controller 26 are supplied through a terminal 110 to the switch signal generation circuit 111, which generates a control signal of plural bits for selecting, in the encoding circuits 102 to 104, a suitable clock signal from the various clock signals from the aforementioned clock generation circuit 121.

Figure 7:
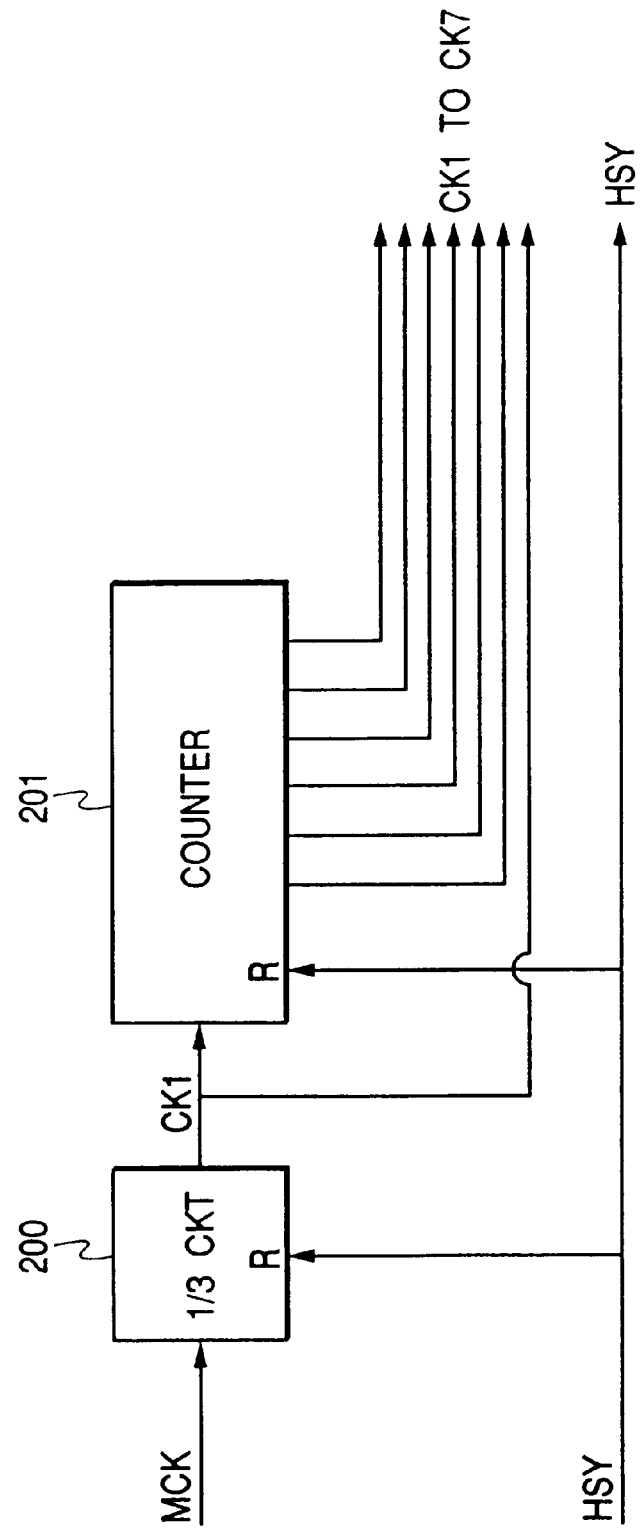
FIG. 7 is a block diagram showing a specific example of the configuration of a clock generation circuit shown in FIG. 6.

FIG. 7 shows a specific example of the configuration of the clock generation circuit 121. A ⅓ frequency circuit 200 divides the frequency of the master clock MCK into ⅓, thereby generating a clock signal CK1 of a frequency for inputting the sample of each color, in case of a resolution of 600 dpi. The clock signal CK1 is input into a counter 201, which generates, from respective stages thereof, clock signals CK2, CK3, CK4, CK5, CK6, CK7 obtained by dividing the frequency of the clock signal CK1 into ½. The counter 201 is reset by the horizontal synchronization signal HSY in order to achieve synchronization therewith. The clock signals CK1 to CK7 thus obtained are supplied to various units of the apparatus.

Figure 8:
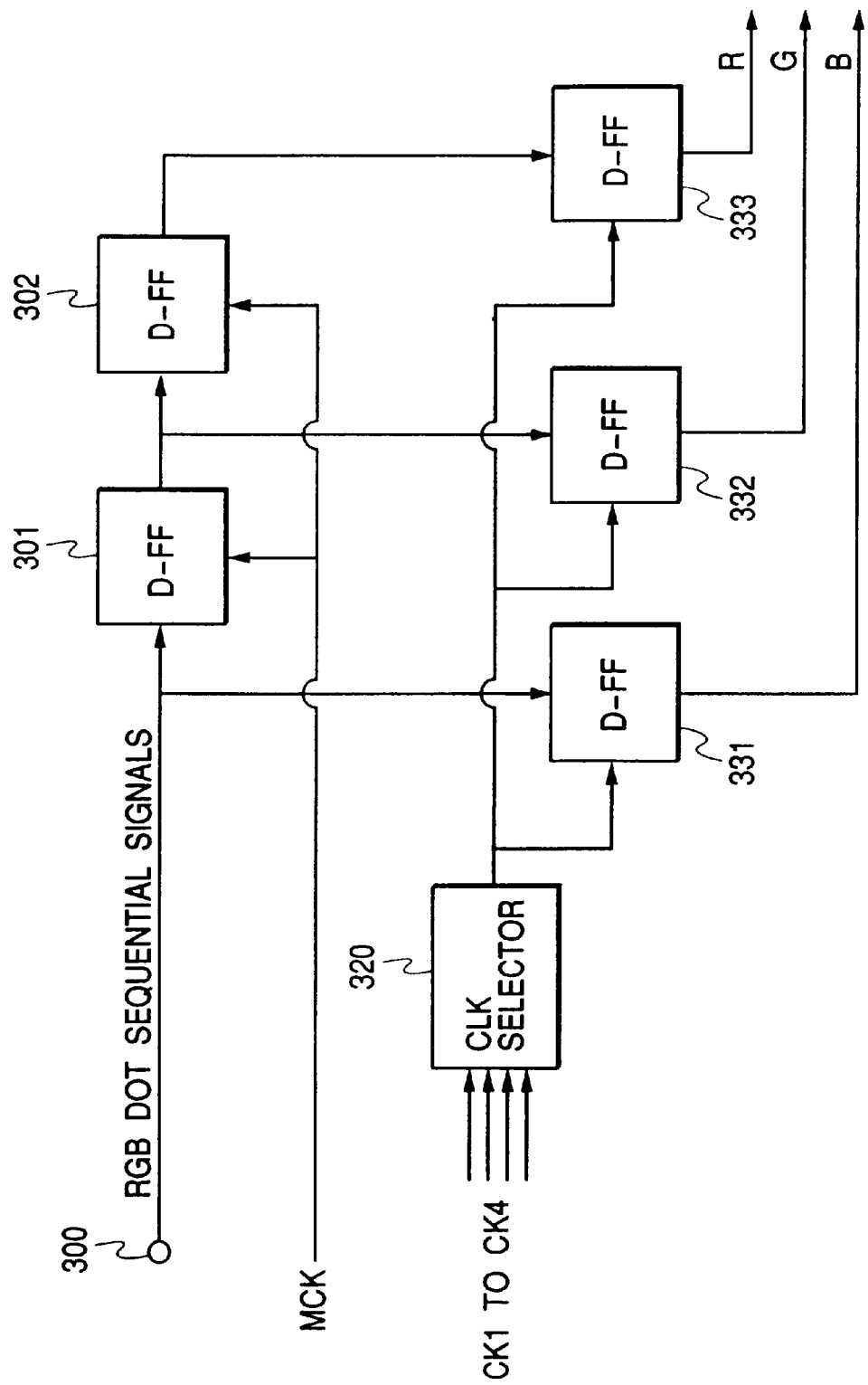
FIG. 8 is a block diagram showing a specific example of the configuration of a synchronization circuit shown in FIG. 6.

FIG. 8 shows an example of the configuration of a synchronization circuit 101, which synchronizes the R, G, B color signals, utilizing the clock signals generated by the clock generation circuit 121. Referring to FIG. 8, a clock selector 320 receives the clock signals CK1 to CK4, and, in the present embodiment, the clock CK1 is selected in case the image signal of 600 dpi is input, while the clock CK2, CK3 or CK4 is selected respectively in case the image signal of 300 dpi, 150 dpi or 75 dpi is input.

The R, G, B dot-sequential signals input from a terminal 300 are in succession delayed in D-type flip-flops (D-FF) 301, 302 by the master clock signal. The three signals thus obtained by shifting the respective samples of the dot-sequential signals are respectively input into D-ports of D-FF's 331, 332, 333 and are sampled by a clock signal CK selected corresponding to the master clock signal, whereby the respective color signals synchronized with the selected clock signal are obtained and supplied to the succeeding stages.

Figure 9:
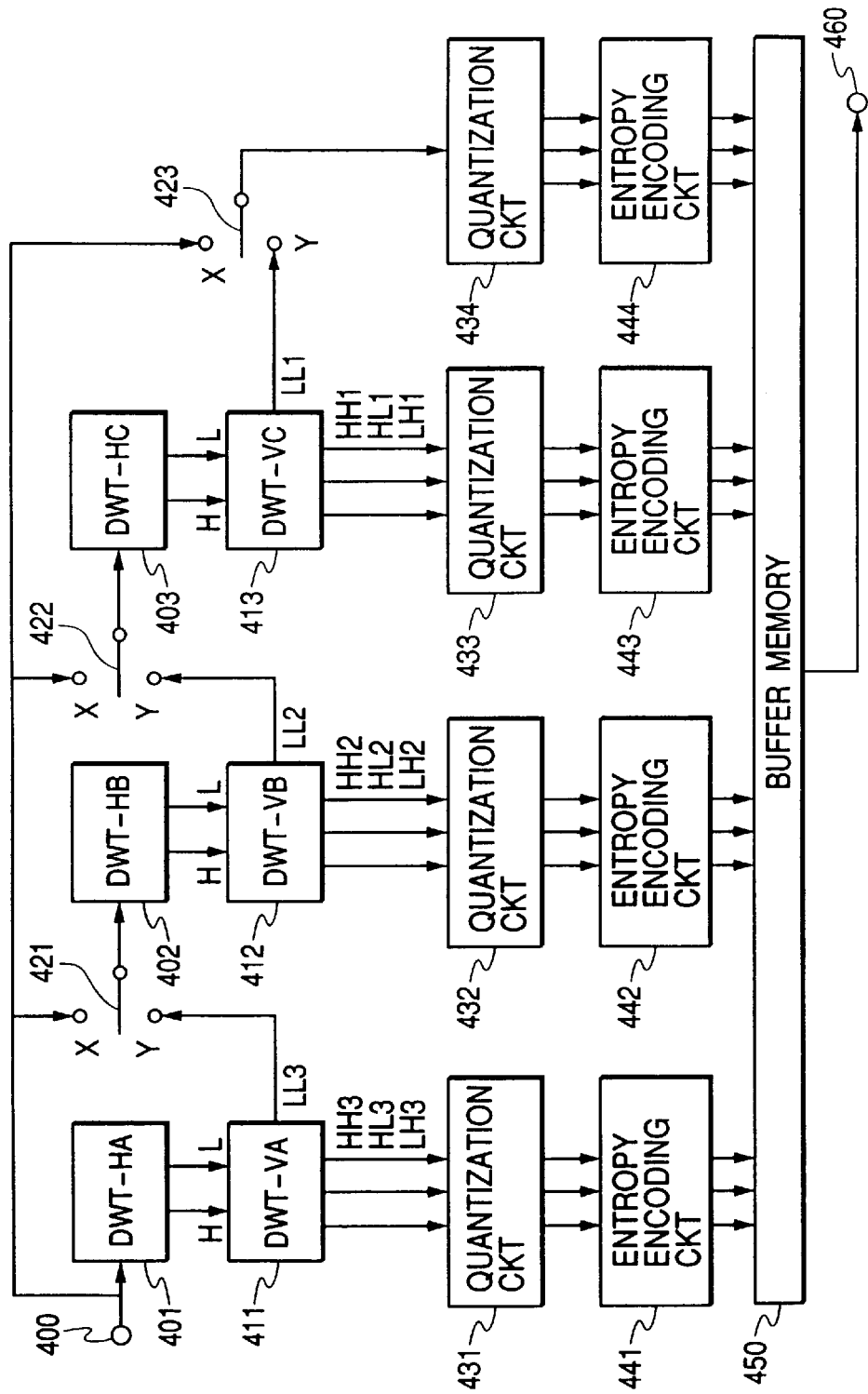
FIG. 9 is a block diagram showing a specific example of the configuration of each encoding circuit shown in FIG. 6.

The R, G, B color signals obtained in the synchronization circuit 101 are respectively supplied to the encoding circuits 102 to 104 of respective colors. The circuits 102 to 104 have a substantially same configuration, which will be explained hereinafter in detail with reference to FIG. 9. FIG. 9 is a block diagram showing the entire configuration of the encoding circuits 102 to 104.

Referring to FIG. 9, a terminal 400 receives the color signal synchronized by the synchronization circuit 101. DWT circuits for the horizontal direction DWT-HA 401, DWT-HB 402, DWT-HC 403 respectively output low-pass coefficients (L) and high-pass coefficients (H) for the horizontal direction, with a frequency equal to ½ of input frequency. Also, DWT circuits for the vertical direction DWT-VA 411, DWT-VB 412, DWT-VC 413 respectively receive low-pass coefficients (L) and high-pass coefficients (H) for the horizontal direction, and respectively output LL, LH, HL and HH. These components LL, LH, HL, HH are output with a frequency of ½ of that of the low-pass coefficients (L) and high-pass coefficients (H) from the DWT circuits 401 to 403 for the horizontal direction.

The clock signals utilized in the DWT circuits 401 to 403 for the horizontal direction and those 411 to 413 for the vertical direction vary according to the operation mode of the scanner, and the selection of such clock signals will be explained later in detail. The components LH, HL, HH obtained in the DWT circuits 411 to 413 for the vertical direction are supplied to quantization circuits 431 to 433 in a succeeding stage and suitably quantized therein. The amount of code can be reduced without much deteriorating the image quality by most roughly quantizing LH3, HL3, HH3 corresponding to the highest frequency component and relatively finely quantizing LH1, HL1, HH1 in these quantization circuits 431 to 433.

On the other hand, the component LL obtained in the DWT circuits 411 to 413 for the vertical direction in each level is supplied to the DWT circuits for the horizontal direction in a succeeding level to realize the DWT of plural levels. The LL of the last level is supplied as LL1 to a quantization circuit 434 and is quantized therein. Since LL1 is the most important information, the quantization circuit 434 executes finer quantization, in comparison with that in the foregoing quantization circuits 431 to 433.

The coefficients quantized in the quantization circuits 431 to 434 are respectively entropy encoded by entropy encoding circuits 441 to 444. For example the entropy encoding circuit collects the quantized coefficients by a predetermined number, for example by the unit of an 8×8 block (tile), then decomposes the coefficient data of each block into bit planes and executes binary arithmetic encoding in the unit of a bit plane, thereby outputting a code stream.

The code streams output from the entropy encoding circuits 441 to 444 are rearranged in a buffer memory 450 into a predetermined order and output from a terminal 460. The output from the terminal 460 constitutes the outputs of the encoding circuits 102 to 104.

Figure 10:
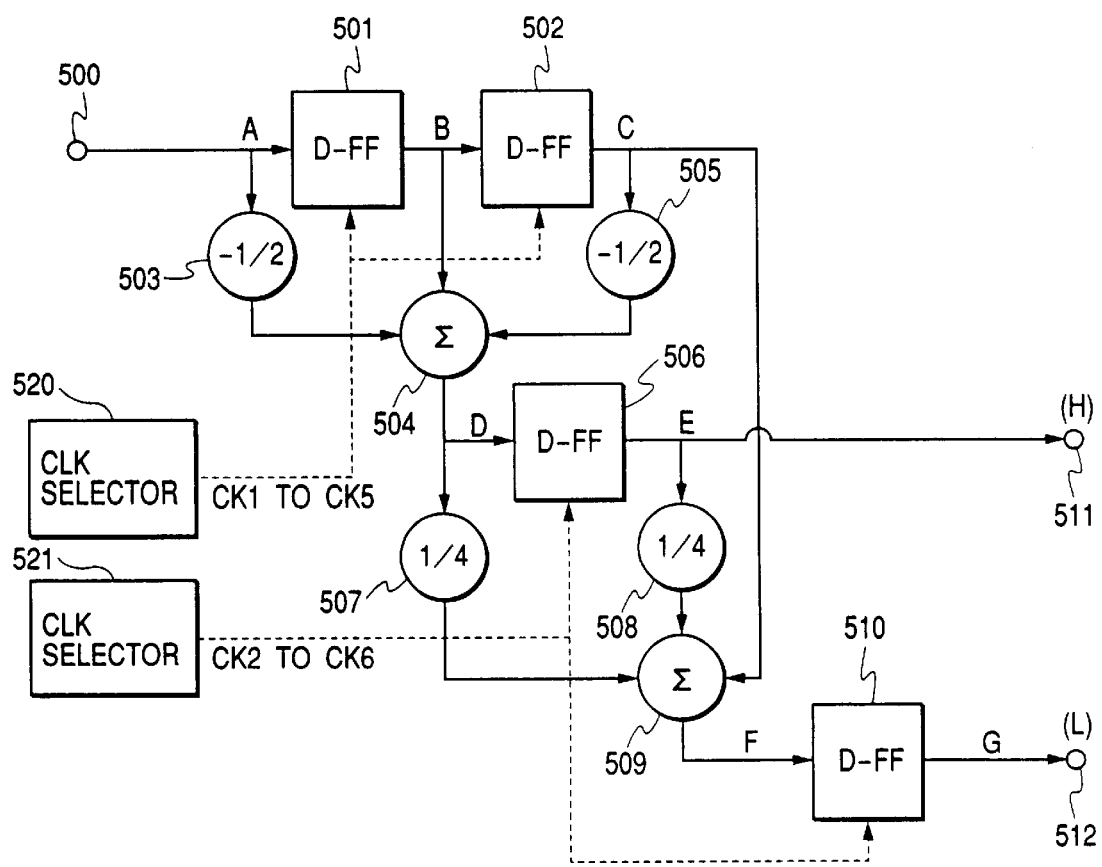
FIG. 10 is a block diagram showing a specific example of the configuration of a horizontal DWT (discrete wavelet transformation) circuit shown in FIG. 9.

Reference is made to FIG. 10 for explaining the specific configuration of the DWT circuits 401 to 403 for the horizontal direction. Referring to FIG. 10, a terminal 500 receives the image signals of respective colors line by line. As the color signals input by the respective DWT circuits for the horizontal direction may have mutually different cycle periods, a necessary clock signal is suitably selected by clock selectors 520, 521. Such selection, to be explained later, is so made that the clock signal output by the clock selector 521 has a frequency equal to ½ of that of the clock signal output from the clock selector 520. More specifically, when the clock selector 520 selects either of the clock signals CK1 to CK5, the clock selector 521 selects a corresponding one of the clock signals CK2 to CK6.

The input color signals are respectively delayed by a clock by the D-flip-flops (D-FF) 501, 502, whereby an input port A of the D-FF 501, an input port B of the D-FF 502 and an output port C thereof simultaneously output values of three pixels adjacent in the horizontal direction. The pixel value output from the input port A of the D-FF 501 and that from the output port C of the D-FF 502 are inverted in polarity and reduced to ½ in the absolute value by –½ circuits 503, 505. Then, an adder 504 adds the outputs of these –½ circuits 503, 505 and of the D-FF 501.

Figure 11:
FIG. 11 is a timing chart showing the function timing of the circuit shown in FIG. 10.

FIG. 11 shows timing charts schematically indicating data of various units in FIG. 10, wherein charts (A) to (G) respectively indicate values of the points A to G shown in FIG. 10. Also P1, P2, P3 and P4 respectively indicate pixel values of the pixels which are mutually adjacent in this order in the horizontal direction.

If the pixel value at the point B in FIG. 10 is P4, those at the points A and C are P5, P3 as will be apparent from FIG. 10. In this state the output value of the adder 504 becomes (–P3/2+P4–P5/2) or P4–(P3+P5)/2, namely the high-pass output (H4) corresponding to the pixel of the pixel value P4.

The output of the adder 504 is delayed by a period corresponding to two pixels, by a D-FF 506 of which the clock frequency is ½ of that of the D-FF's 501, 502. The outputs from the input port D and the output port E of the D-FF 506 are both high-pass outputs and are respectively multiplied by ¼ by ¼ circuits 507, 508 for supply to an adder 509. On the other hand, the value from the output port C of the D-FF 502 is also supplied to the adder 509.

In case the pixel value at the point B is P4, the output of the adder 509 becomes {P4−(P3+P5)/2}/4+{P2−(P1+P3)/2}/4+P3 or (−P1+2 P2+6 P3+2 P4 P5)/8, namely the low-pass output (L3) corresponding to the pixel of the pixel value P3. In this state, as the point E is given a high-pass output (H2) corresponding to the pixel of the pixel value P2, the low-pass output is delayed by a period corresponding to two pixels by a succeeding D-FF 510. As a result, the terminals 511, 512 simultaneously output the high-pass output (H) and the low-pass output (L) corresponding to the mutually adjacent pixels.

Figure 12:
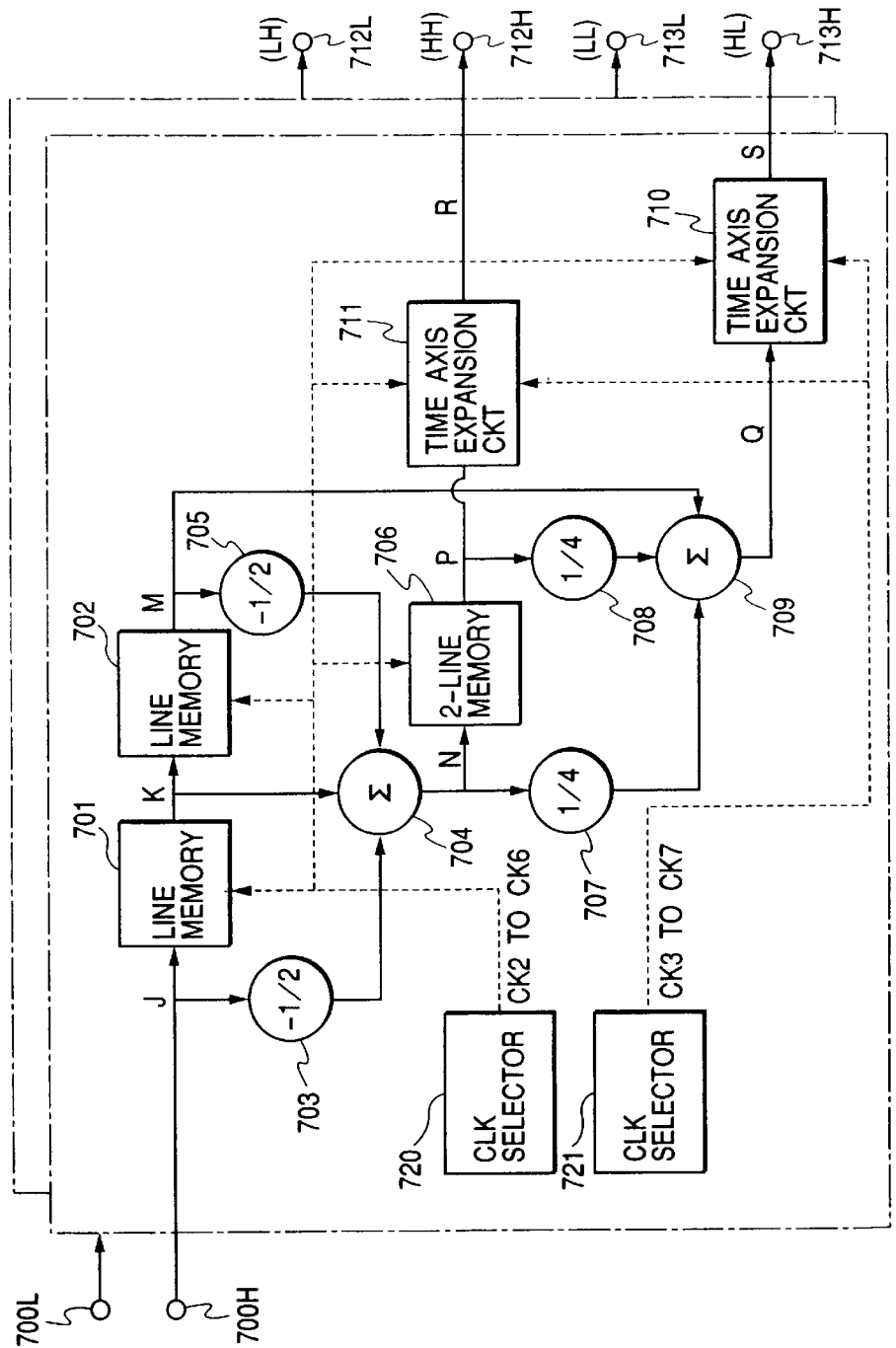
FIG. 12 is a block diagram showing a specific example of the configuration of a vertical DWT (discrete wavelet transformation) circuit shown in FIG. 9.

Reference is made to FIG. 12 for explaining the specific circuit configuration of the DWT circuits 411 to 413 for the vertical direction. FIG. 13 shows timing charts (J) to (S) showing data in the units (J) to (S) in FIG. 12. As shown in FIG. 12, each of the DWT circuits 411 to 413 is composed of a pair of similar circuits for respectively processing the high-pass output H and the low-pass output L. Since these circuits are similar in configuration, the following description will be given only to one of these circuits.

Referring to FIG. 12, a terminal 700L receives the low-pass output of the horizontal direction output by the DWT circuit for the horizontal direction, and a terminal 700H receives the high-pass output of the horizontal direction output by the DWT circuit for the horizontal direction.

As will be apparent from the description of FIG. 10, these data are input for each line. In such operation, since the horizontal high-pass outputs and the horizontal low-pass outputs input by the respective DWT circuits for the vertical direction may have mutually different cycle periods, the clock selectors 720, 721 suitably select the necessary clock signals. As in the case of FIG. 10, the clock signal output by the clock selector 721 is so selected as to have a frequency equal to ½ of that output by the clock selector 720. Thus, when the clock selector 720 selects one of the clock signals CK2 to CK6, the clock selector 721 selects the corresponding one of the clock signals CK3 to CK7.

The input horizontal high-pass outputs (or horizontal low-pass outputs) are respectively delayed by a line in line memories 701, 702, whereby an input port J of the line memory 701, an input port K of the line memory 702 and an output port M thereof simultaneously output the values of three pixels mutually adjacent in the vertical direction. The pixel value output from the input port J of the line memory 701 and that from the output port M of the line memory 702 are inverted in polarity and reduced to ½ in the absolute value by −½ circuits 703, 705. Then, an adder 704 adds the outputs of these −½ circuits 703, 705 and of the line memory 701.

In FIG. 13, line1, line2, line3, line4, . . . indicate the pixel values of respective lines, mutually adjacent in the vertical direction in the order of line1, line2, line3, line4, . . . if the pixel value of the line4 is output at the point E in FIG. 12, those at the points J and M are pixel values of the lines 5, 3 as will be apparent from FIG. 13. In this state the output value of the adder 704 becomes (−line3/2+line4−line5/2), namely the high-pass output (H-line4) corresponding to the pixel of the pixel value of the line4.

The output of the adder 704 is delayed by a period corresponding to two lines, by a 2-line memory 706. The outputs from the input port N and the output port P of the two-line memory 706 are both high-pass outputs and are respectively multiplied by ¼ by ¼ circuits 707, 708 for supply to an adder 709. On the other hand, the value from the output port M of the line memory 702 is also supplied to the adder 709.

In case the pixel value of the line4 is output at the point K, the output of the adder 709 becomes {line4−(line3+line5)/2}/4+{line2−(line1+line3)/2}/4 +line3, or (−line1+2 line2+6 line3+2 line4−line5)/8, namely the low-pass output (L-line3) corresponding to the line of the pixel value of the line3. In this state, the point P is given a high-pass output (H-line2) corresponding to the line of the pixel value of the line2.

The low-pass outputs and the high-pass outputs of these adjacent lines are respectively expanded in time axis by time axis expanding circuits 710, 711, whereby the high-pass output (H) and the low-pass output (L) corresponding to the pixels of the mutually adjacent lines are simultaneously output. Thus it will be apparent that the circuit shown in FIG. 13, in case of receiving the high-pass output in the horizontal direction, provides the HH coefficient and the HL coefficient, and, in case of receiving the low-pass output in the horizontal direction, provides the LH coefficient and the LL coefficient. These HH, HL, LH, LL coefficients are respectively output from terminals 712H, 713H, 712L and 713L.

Figure 14:
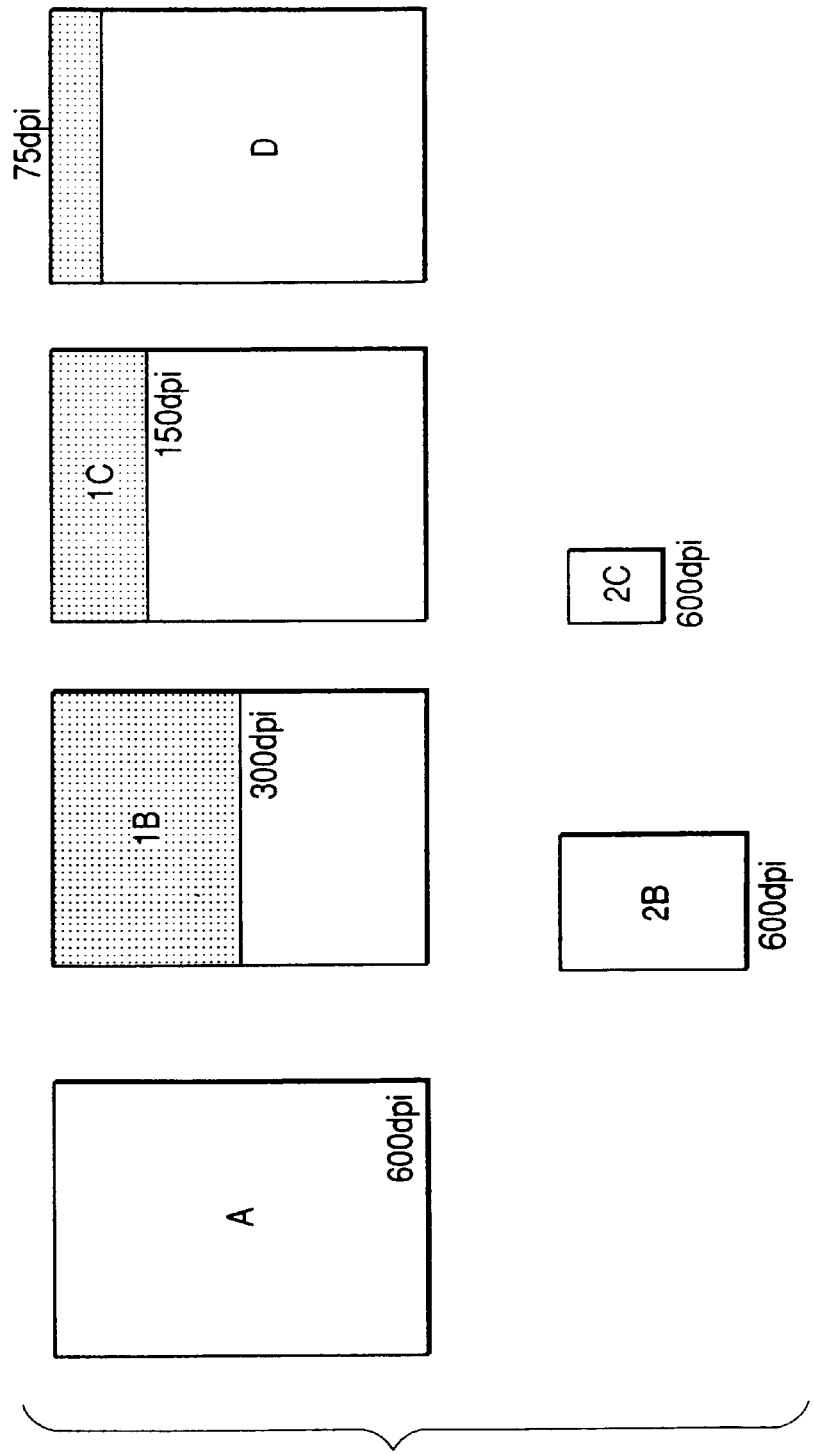
FIG. 14 is a view showing various operation modes of the scanner embodying the present invention.

Hereinafter, there will be explained the operation modes of the present embodiment, with reference to FIG. 14, in which A indicates a mode for reading the entire area of the original of a predetermined size (e.g., A4-sized original) with 600 dpi, 1B indicates a mode for reading the entire area of the original of a predetermined size with 300 dpi, 1C indicates a mode for reading the entire area of the original of a predetermined size with 150 dpi, and 1D indicates a mode for reading the entire area of the original of a predetermined size with 75 dpi. Also 2B indicates a mode for reading the entire area of an original of a size equal to ¼ of the aforementioned predetermined size (e.g., A5-sized original) with 600 dpi, and 2C indicates a mode for reading the entire area of an original of a size equal to ¹⁄₁₆ of the aforementioned predetermined size (e.g., A6-sized original) with 600 dpi. In the present specification, for the purpose of simplicity, the image magnification in all the operation modes is assumed to be 100%.

FIG. 15 is a chart showing the kinds of clock signals selected by the clock selectors in various units of the apparatus and the states of switches. Hereinafter, there will be explained the operations in these modes, utilizing the above-described names of the modes and making reference to FIGS. 14 and 15.

At first there will be explained the function in the mode A. As explained in the foregoing, a signal (parameters) indicating the above-described mode is supplied from the system controller 26 of the scanner, through the terminal 110 shown in FIG. 6, to the switching signal generation circuit 111, whereby the control signals of plural bits corresponding to the mode A are respectively supplied to the encoding circuits 102, 103, 104. In such mode A, the clock selector 320 shown in FIG. 8 selects the clock CK1 obtained by dividing the frequency of the master clock MCK by 3, as shown in FIG. 15. Consequently, the RGB dot-sequential signals input into the terminal 300 shown in FIG. 8 are all sampled, and the D-FF's 331, 332, 333 output the synchronized color signals with a cycle period of ⅓.

These color signals are supplied to the encoding circuits shown in FIG. 9, and the switches shown in FIG. 9 are all connected to the sides Y as shown in FIG. 15, whereby the clock selectors 520, 521, 720, 721 of the horizontal and vertical DWT circuits 401, 402, 403, 411, 412, 413 respectively select the clock signals as shown in FIG. 15. The selection of the clock signals in these DWT circuit are executed according to the aforementioned control signal of plural bits.

In the mode A, the horizontal DWT circuit DWT-HA 401 is operated by the clocks CK1, CK2 whereby the high-pass coefficient (H) and the low-pass coefficient (L) are output in synchronization with the clock CK2. The vertical DWT circuit 411, receiving these coefficients, is operated by the clocks CK2, CK3 thereby outputting the components HH3, HL3, LH3, LL3 in synchronization with the clock CK3. The components HH3, HL3, LH3 are encoded by the quantization circuit 431 and the entropy encoding circuit 441 and are supplied to the buffer memory. The LL3 is supplied, through the side Y of the switch 421, to the horizontal DWT circuit DWT-HB 402 of the following level.

The horizontal DWT circuit 402 is operated by the clocks CK3, CK4 to output the high-pass coefficient (H) and the low-pass coefficient (L) in synchronization with the clock CK4. The vertical DWT circuit 412 is operated by the clocks CK4, CK5 thereby outputting the components HH2, HL2, LH2, LL2 in synchronization with the clock CK5. The components HH2, HL2, LH2 are encoded by the quantization circuit 432 and the entropy encoding circuit 442 and are supplied to the buffer memory 450. The LL2 is supplied, through the side Y of the switch 422, to the horizontal DWT circuit 403 of the following level.

The horizontal DWT circuit 403 is operated by the clocks CK5, CK6 to output the high-pass coefficient (H) and the low-pass coefficient (L) in synchronization with the clock CK6. The vertical DWT circuit 413 is operated by the clocks CK6, CK7 thereby outputting the components HH1, HL1, LH1, LL1 in synchronization with the clock CK7. The components HH1, HL1, LH1 are encoded by the quantization circuit 433 and the entropy encoding circuit 443 and are supplied to the buffer memory 450. Also the component LL1 is encoded, through the side Y of the switch 423, by the quantization circuit 434 and the entropy encoding circuit 444 and is supplied to the buffer memory 450.

The buffer memory 450 outputs the codes of the components (LL1, LH1, HL1, HH1, LH2, HL2, HH2, LH3, HL3, HH3) from the entropy encoding circuits 441, 442, 443, 444 in a predetermined order to a terminal 460 as the encoded output.

Hereinafter, there will be explained the function in the mode 1B. In the mode 1B, the clock selector 320 shown in FIG. 8 selects the clock CK2 obtained by dividing the frequency of the master clock MCK by 3, and further by 2. Consequently, the RGB dot-sequential signals input into the terminal 300 shown in FIG. 8 are sampled in every other dots, and the D-FF's 331, 332, 333 output the synchronized color signals with a cycle period of ⅙. In this state, as the conveying speed of the original is 2 times of that in the mode A, the number of lines obtained from the original of a same predetermined size (A4 size) is ½ of that in the mode A. Also the number of samples in each line is reduced to ½ of that in the mode A, by averaging the data of two pixels in the aforementioned main scan movement averaging unit 42.

These color signals are supplied, through a terminal x of the switch 421 of the encoding circuit shown in FIG. 9, to the horizontal DWT circuit DWT-HB 402. The horizontal DWT circuit DWT-HB 402 is operated by the clocks CK2, CK3 while the vertical DWT circuit 412 is operated by the clock CK3 and the clock CK4, thereby providing the components HH2, HL2, LH2, LL2 in synchronization with the clock CK4. The horizontal DWT circuit DWT-HA 403 is operated by the clocks CK4, CK5 while the vertical DWT circuit 413 is operated by the clock CK5 and the clock CK6, thereby providing the components HH1, HL1, LH1, LL1 in synchronization with the clock CK6. The component LL1 is encoded, through the side Y of the switch 423, by the quantization circuit 434 and the entropy encoding circuit 444.

The buffer memory 450 outputs the codes from the entropy encoding circuits 442, 443, 444 in a predetermined order to the terminal 460. In this manner there are output the codes of the components (LL1, LH1, HL1, HH1, LH2, HL2, HH2) fewer by one level in comparison with the mode A.

Hereinafter, there will be explained the function in the mode 1C. The clock selector 320 shown in FIG. 8 selects the clock CK3 obtained by dividing the frequency of the master clock MCK by 3, and further by 4. Consequently, the RGB dot-sequential signals input into the terminal 300 shown in FIG. 8 are sampled once in every four dots, and the D-FF's 331, 332, 333 output the synchronized color signals with a cycle period of 1/12. In this state, as the conveying speed of the original is 4 times of that in the mode A, the number of lines obtained from the original of a same predetermined size (A4 size) is ¼ of that in the mode A, and the number of samples in each line is reduced to ¼ of that in the mode A.

These color signals are supplied, through terminals x of the switches 421, 422 of the encoding circuits shown in FIG. 9, to the horizontal DWT circuit DWT-HC 403. The horizontal DWT circuit 403 is operated by the clocks CK3, CK4 while the vertical DWT circuit 413 is operated by the clocks CK4, CK5, thereby providing the components HH1, HL1, LH1, LL1 in synchronization with the clock CK5. The component LL1 is encoded, through the side Y of the switch 423, by the quantization circuit 434 and the entropy encoding circuit 444.

The buffer memory 450 outputs the codes from the entropy encoding circuits 443, 444 in a predetermined order to the terminal 460, as the encoded outputs. In this manner there are output the codes of the components (LL1, LH1, HL1, HH1) fewer by two levels in comparison with the mode A.

Next, there will be explained the function in the mode D. The clock selector 320 shown in FIG. 8 selects the clock CK4 obtained by dividing the frequency of the master clock MCK by 3, and further by 8. Consequently, the RGB dot-sequential signals input into the terminal 300 shown in FIG. 8 are sampled once in every 8 dots, and the D-FF's 331, 332, 333 output the synchronized color signals with a cycle period of 1/24. In this state, as the conveying speed of the original is 8 times of that in the mode A, the number of lines obtained from the original of a same predetermined size (A4 size) is ⅛ of that in the mode A. Also the number of samples in each line is reduced to ⅛ of that in the mode A.

These color signals are supplied, through terminals y of the switches 421, 422, 423 of the encoding circuits shown in FIG. 9, and are encoded directly by the quantization circuit 434 and the entropy encoding circuit 444 as in the case of the component LL1. The buffer memory 450 outputs the code of the component LL1 from the entropy encoding circuit 444 to the terminal 460 as the encoded output. The line memories of the vertical DWT circuits 412, 413 naturally have capacities respectively of ½, ¼ of that of the line memory of the vertical DWT circuit 411.

Hereinafter, there will be explained the modes 2B and 2C. As explained in the foregoing, the mode 2B is to read the entire area of an original of a size equal to ¼ of the aforementioned predetermined size with 600 dpi, and the 2C is to read the entire area of an original of a size equal to ¹⁄₁₆ of the aforementioned predetermined size with 600 dpi.

In the mode 2B, the pixel data of each line read from the A5-sized original is subjected, by the main scan movement averaging unit 42, to a process corresponding to expansion and are output with a uniform interval equivalent to the image reading with 300 dpi, whereby the number of obtained lines becomes ½ of that in the mode A and the number of samples in each line also becomes ½ of that in the mode A. The moving speed of the optical unit 4 in the sub scanning direction is same as in the mode A, but the moving range becomes ½ of that in the mode A or 1B. Consequently the operation itself of the encoding unit 45 is same as in the mode 1B. Therefore the encoding unit 45 shown in FIG. 9 outputs the codes of the components (LL1, LH1, HL1, HH1, LH2, HL2, HH2) fewer by one level in comparison with the mode A.

In the mode 2C, the pixel data of each line read from the A6-sized original is output, by the main scan movement averaging unit 42, with a uniform interval equivalent to the image reading with 150 dpi, whereby the number of obtained lines becomes ¼ of that in the mode A and the number of samples in each line also becomes ¼ of that in the mode A. The moving speed of the optical unit 4 in the sub scanning direction is same as in the mode A, but the moving range becomes ¼ of that in the mode A or 1C. Consequently the operation itself of the encoding unit 45 is same as in the mode 1C. Therefore the encoding unit 45 shown in FIG. 9 outputs the codes of the components (LL1, LH1, HL1, HH1) fewer by two levels in comparison with the mode A.

In the above-described system consisting of the scanner and the host computer, as explained in the foregoing, the number of levels of the discrete wavelet transformation is suitably set in the image encoding unit according to the size of the original to be read in the scanner and the reading resolution, so that, in any of the modes A, 1B, 1C, D, 2B and 2C, the resolution and the size of the final LL component image can be matched, and an image of desired resolution and size can be obtained from any image through a similar decoding process.

Also, since the pixel number (image size) of the final LL component does not become extremely small or large, the effectiveness of the high efficiency encoding can always be maintained at least at a predetermined level, and it is rendered possible to minimize the loss in time by the execution of meaningless sub band division (discrete wavelet transformation.

In the foregoing embodiment, there has been explained a configuration in which the encoding means is composed of a hardware, but it may naturally be composed of a software, utilizing a CPU and a ROM. In the configuration by a software, similar functions can be realized by fetching the image input parameters (resolution and size information) by such software and switching the number of executions of the software for the discrete wavelet transformation according to such parameters.

Also in the foregoing embodiment, there has been explained, for the purpose of simplicity, a case where the image read by the scanner is limited to certain sizes (A4, A5, A6 etc.) and the reading resolution is limited to certain values such as 600 dpi, 300 dpi etc., but the digital image of any size and any resolution can be handled according to the spirit of the present invention. More specifically, in case the ratio of the resolution or size is not a power of 2, effects similar to those in the foregoing embodiment can be expected by setting the number of levels of the discrete wavelet transformation in such a manner that the ratio of the resolution or size in the final LL component does not exceed 1:2.

Furthermore, the present invention is not limited to the concept of limiting the resolution or size of the final LL component to a certain range but also includes an apparatus or a system in which, in executing the discrete wavelet transformation of an image not exceeding a specified pixel number, the number of levels of such transformation according to the resolution, size and pixel number. As explained in the foregoing, this is extremely useful in consideration of the effectiveness itself of the high efficiency encoding of the image.

Hereinafter, there will be explained, with reference to FIGS. 16 and 17, an embodiment of the present invention in which priority is given to the effectiveness of the high efficiency encoding. The present embodiment is to maintain the number of pixels of the final LL components at least at 64 pixels both in the vertical and horizontal directions. This is to avoid a situation where the number of pixels (wavelet coefficients) contained in each component cannot provide a sufficient compression efficiency in case the number of pixels in each of the final component LL and the final components LH, HL, HH becomes less than 64×64 pixels. In the present embodiment, the configuration of the scanner (image input system) is same as shown in FIG. 2, while the configuration of the image process means shown in FIG. 2 is same as shown in FIG. 4, and the encoding circuit 45 can be same as that shown in FIGS. 6 to 9.

Figure 16:
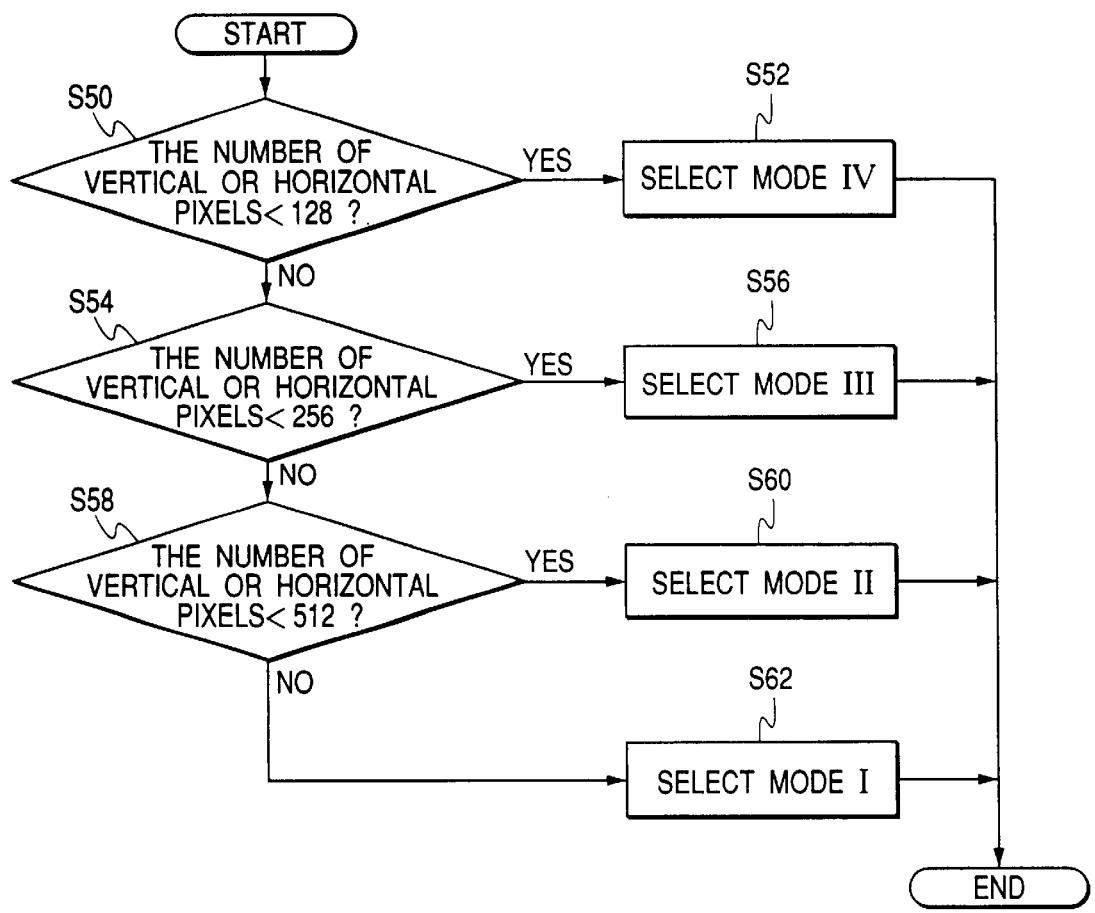
FIG. 16 is a flow chart showing the function of an image input system in another embodiment of the present invention.
Figures 17, 18:
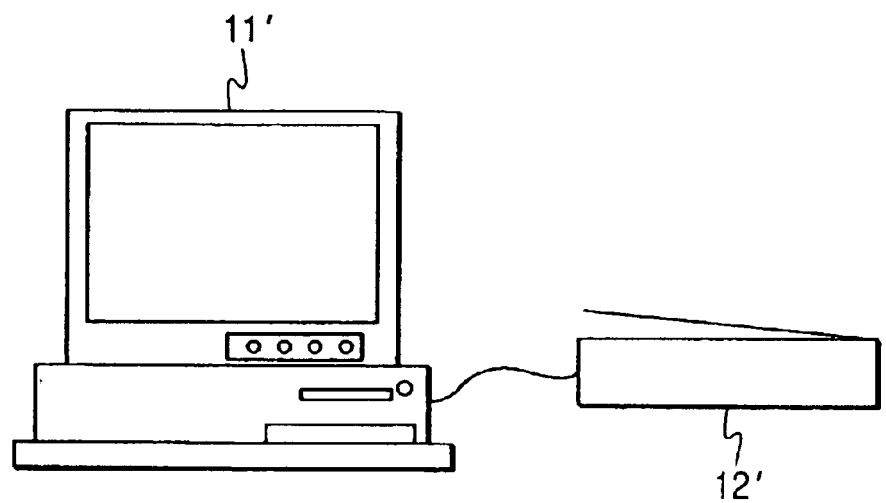
FIG. 17 is a view showing various operation modes in the flow chart shown in FIG. 16.
FIG. 18 is a view showing a conventional system consisting of a scanner and a host computer.

FIG. 16 is a flow chart showing the process of the system controller 28, in executing the scanning operation and the transmission to the host computer 21 in the step S34 or S38 in the flow chart shown in FIG. 3, for setting the image process means 29 at any of modes I, II, III and IV shown in FIG. 17.

In FIG. 16, a step S50 discriminates whether the image to be transmitted to the host computer 21 is less than 128 pixels in the vertical and horizontal directions. This corresponds to a discrimination whether, after DWT of a level, the number of pixels (wavelet coefficients) of each finally obtained component (e.g., LL) becomes less than 64 pixels. If the pixel number in the vertical or horizontal direction is less than 128 pixels, there is selected a mode IV for executing the entropy encoding without executing DWT (step S52).

For example, in case of reading an A4-sized original with 600 dpi, the number of pixels is about 6000 in the vertical direction and about 4800 in the horizontal direction, but, in case of reading with 75 dpi, the number of pixels becomes 750×600. Also the number of pixels becomes 375×300 in case of reading an A5-sized original with 75 dpi, and 186×150 in case of reading an A6-sized original with 75 dpi. Therefore, if the minimum original size readable by the scanner of the present embodiment is A6, the number of pixels in the vertical or horizontal direction becomes less than 128 pixels only if the image is cropped in the step S38 shown in FIG. 3.

In the mode IV, as shown in FIG. 17, the switch 423 shown in FIG. 9 is connected to the side X, so that the image data (pixel data) not subjected to the DWT are directly supplied to the quantization circuit 434 and the entropy encoding circuit 444 and the entropy encoding is executed in a state without division into the DWT coefficient components, whereby the efficiency of encoding can be maintained high.

If the number of pixels is at least equal to 128 both in the horizontal and vertical directions, the sequence proceeds to a step S54 for discriminating whether the number of pixels in the horizontal or vertical direction is less than 256. Such situation occurs in case an A6-sized original is read with 75 dpi, or in case an image of a larger resolution or size is cropped in the step S38 shown in FIG. 3. In such case there is selected a mode III of executing the DWT for one level only and then executing the quantization and the entropy encoding (step S56).

In the mode III, the switches 423, 422 are respectively connected to the sides Y and X as shown in FIG. 17, so that the DWT-HC 403 and the DWT-LC 413 execute the two-dimensional DWT of a level, and the number of the DWT coefficients in the vertical and horizontal directions in each of thus obtained components (LL, LH, HL, HH) exceeds 64 but is less than 128 pixels. Therefore the entropy encoding circuits 443, 444 can be constructed relatively small without deteriorating the efficiency of the entropy encoding.

Similarly, a step S58 discriminates whether the number of pixels in the horizontal or vertical direction is less than 512. Such situation occurs in case an A6-sized original is read with 150 dpi or an A5-sized original with 75 dpi, or in case an original image of a larger resolution or size is cropped. In such case there is selected a mode II of executing the DWT for two levels and then executing the quantization and the entropy encoding (step S60).

In the mode II, the switches 422, 423 are respectively connected to the sides Y and X as shown in FIG. 17, so that the two-dimensional DWT is executed in two levels, and the number of the DWT coefficients in the vertical and horizontal directions in each of thus obtained components (LL, LH, HL, HH) exceeds 64 but is less than 128 pixels. Therefore the entropy encoding circuits 443, 444 can be constructed relatively small without deteriorating the efficiency of the entropy encoding.

If the step S58 confirms that the number of pixels in the vertical and horizontal directions is at least equal to 512 pixels, there is selected a mode I. If without cropping, the mode I is selected in case of reading an A4-sized original with 75 dpi or a higher resolution, or reading an A5-sized original with 150 dpi or a higher resolution, or reading an A6-sized original with 300 dpi or a higher resolution.

In the mode I, the switches 422, 423, 421 are connected to the sides Y as shown in FIG. 17, so that the DWT is executed in three levels, and the number of the DWT coefficients in the vertical and horizontal directions in each of thus obtained components (LL, LH, HL, HH) exceeds 64. Thus the efficiency of the entropy encoding circuit is not deteriorated. Also the entropy encoding circuits can be constructed compact by applying the entropy encoding circuits 441 to 444 for each of the 64×64 coefficients.

In the above-described embodiment, there have not been explained the clock signals supplied to the DWT circuits 401 to 403 and 411 to 413. The clock signals supplied to the DWT circuit 401 in the move I are variable depending on the pixel number of the original, and are CK1 and CK2 in case of reading an original at least equal to A5 size but smaller than A4 size with 600 dpi without cropping, and there are employed frequency-divided clock signals as the original size is halved. In other DWT circuits, there are employed, as explained in the foregoing, the clock signals obtained by frequency division of those supplied to the DWT circuit 401.

Similarly, in case of reading an original of the smallest pixel number to be processed in the mode I, for example reading an A4-sized original with 75 dpi, the clock signals supplied to the DWT circuit 401 are CK4 and CK5, and, in other DWT circuits, there are employed clock signals obtained by frequency division of those supplied to the DWT circuit 401. Similarly, the clock signals supplied to the DWT circuit 401 are CK5 and CK6 in the mode II, CK6 and CK7 in the mode III, and CK7 and a clock signal obtained by halving the frequency of CK7 in the mode IV. In the mode II, III or IV, other DWT circuits naturally employ the clock signals obtained by dividing the frequency of those supplied to the DWT circuit 401.

In the foregoing embodiment, the number of levels of DWT is determined according to the number of pixels determined by the resolution of the image and the size (cropped size) thereof, whereby it is rendered possible to execute DWT in the largest possible number of levels within a range capable of maintaining the efficiency of the entropy encoding, thereby achieving the maximum encoding efficiency.

As explained in the foregoing, in the image input apparatus, image processing apparatus, image input method, image processing method and image input system of the present invention, in inputting an image of any resolution or size, it is rendered possible to easily decode a sub band encoded image to obtain an image not significantly different in the resolution or size, whereby the handling of the image signal after encoding is facilitated. Also the efficiency of the encoding itself is not deteriorated since the size or resolution of the finally obtained sub band image has the transformation coefficients not less than a predetermined number.

The present invention is subject to various modifications within the scope and spirit of the appended claims.

What is claimed is:

1. An image input apparatus comprising:
    photoelectric conversion means for converting an optical image into a digital image;
    encoding means for sub-band encoding the digital image;
    designation means for designating a resolution of the digital image; and
    control means for determining a number of levels of the sub-band encoding according to the designated resolution,
    wherein said control means executes control in such a manner that the number of levels of the sub-band encoding becomes larger in an image of a higher resolution than in an image of a lower resolution.

2. An apparatus according to claim 1, wherein said encoding means executes discrete wavelet transformation on the digital image and entropy encoding on converted data, and said control means controls the number of transformation levels of the discrete wavelet transformation.

3. An apparatus according to claim 2, wherein said photoelectric conversion means is adapted to read the optical image in a unit of a line, and said encoding means executes the discrete wavelet transformation on the digital image in the unit of a line.

4. An apparatus according to claim 1, having a first mode for inputting a digital image of a first resolution and a second mode for inputting an image of a resolution equal to ½ of the first resolution, wherein said control means sets the number of levels of the sub-band encoding in the first mode larger by one in comparison with the number of levels of the sub-band encoding in the second mode, thereby matching the resolution of a lowest frequency band.

5. An image input apparatus comprising:
    photoelectric conversion means for converting an optical image into a digital image;

encoding means for sub-band encoding the digital image;
designation means for designating a size of the input optical image; and
control means for determining a number of levels of the sub-band encoding according to the designated size,
wherein said control means executes control in such a manner that the number of levels of the sub-band encoding becomes larger in an image of a higher resolution than in an image of a lower resolution.

6. An apparatus according to claim 5, wherein said encoding means executes discrete wavelet transformation on the digital image and entropy encoding on converted data, and said control means controls the number of transformation levels of the discrete wavelet transformation.

7. An apparatus according to claim 6, wherein said photoelectric conversion means is adapted to read the optical image in a unit of a line, and said encoding means executes the discrete wavelet transformation on the digital image in the unit of a line.

8. An apparatus according to claim 5, having a first mode for inputting a digital image by reading an original of a first size and a second mode for inputting a digital image by reading an original of a size equal to ¼ of the first size, wherein said control means sets the number of levels of the sub-band encoding in the first mode larger by one in comparison with the number of levels of the sub-band encoding in the second mode, thereby matching the size of the image of the lowest frequency band.

9. An apparatus according to claim 5, wherein said designation means further designates the resolution of the digital image, and said control means determines the number of levels of said sub-band encoding according to both a designated size and a designated resolution.

10. An image input apparatus comprising:
photoelectric conversion means for converting an optical image into a digital image;
encoding means for sub-band encoding the digital image; and
control means for determining the number of levels of the sub-band encoding according to the number of pixels of the image input from said photoelectric conversion means to said encoding means,
wherein said control means determines the number of levels of the sub-band encoding according to a fewer one of the number of pixels of the image in a vertical direction and that of the image in a horizontal direction.

11. An apparatus according to claim 10, wherein said photoelectric conversion means is adapted to read the optical image in a unit of a line, and said encoding means executes the discrete wavelet transformation on the digital image in the unit of a line.

12. An apparatus according to claim 10, wherein the sub-band encoding is a two-dimensional discrete wavelet transformation, and said control means limits the number of levels of the sub-band encoding in such a manner that the wavelet transformation coefficients obtained for each component are present by at least a predetermined number in a vertical direction and in a horizontal direction.

13. An apparatus according to claim 10, further comprising means for cropping the image from said photoelectric conversion means, wherein an image cropped by said cropping means is sub-band encoded by said encoding means.

14. An image input method which comprises, in sub-band encoding of a digital image obtained by photoelectric conversion of an optical image, determining a number of levels of the sub-band encoding according to the designated resolution of the digital image,
wherein the number of levels of the sub-band encoding is made larger in an image of a higher resolution than in an image of a lower resolution.

15. A method according to claim 14, wherein the sub-band encoding executes discrete wavelet transformation on the digital image and entropy encoding on converted data, and the number of transformation levels of the discrete wavelet transformation is determined according to the designated resolution of the digital image.

16. An image input method which comprises, in sub-band encoding of a digital image obtained by photoelectric conversion of an optical image, determining a number of levels of the sub-band encoding according to a size of the input optical image,
wherein the number of levels of the sub-band encoding is made larger in an image of a larger size than in an image of a smaller size.

17. A method according to claim 16, wherein the number of levels of the sub-band encoding is determined according to both the size of the input optical image and the designated resolution.

18. An image input method which comprises, in sub-band encoding of a digital image obtained by photoelectric conversion of an optical image, determining the number of levels of the sub-band encoding according to the number of pixels of the image to be encoded,
wherein the number of levels is determined according to a fewer one of the number of pixels of the image in a vertical direction and that of the image in a horizontal direction.

19. A method according to claim 18, wherein the sub-band encoding is a two-dimensional discrete wavelet transformation, and the number of levels of the sub-band encoding is limited in such a manner that the wavelet transformation coefficients obtained for each component are present by at least a predetermined number in a vertical direction and in a horizontal direction.

20. A method according to claim 18, wherein a photoelectrically converted image is rendered capable of cropping, and the cropped image is sub-band encoded.

21. An image processing apparatus comprising:
encoding means for sub-band encoding an input digital image; and
control means for determining a number of levels of the sub-band encoding according to the resolution of the digital image,
wherein said control means executes control in such a manner that the number of levels of the sub-band encoding becomes larger in an image of a higher resolution than in an image of a lower resolution.

22. An image processing apparatus according to claim 21, wherein said encoding means executes discrete wavelet transformation on the digital image and entropy encoding on converted data, and said control means controls the number of transformation levels of the discrete wavelet transformation.

23. An apparatus according to claim 21, wherein the resolution of the digital image is input from an external apparatus.

24. An apparatus according to claim 21, having a first mode for inputting a digital image of a first resolution and a second mode for inputting an image of a resolution equal to ½ of the first resolution, wherein said control means sets the number of levels of the sub-band encoding in the first mode larger by one in comparison with the number of levels of the sub-band encoding in the second mode, thereby matching the resolution of a lowest frequency band.

25. An image processing apparatus comprising:

encoding means for sub-band encoding an input digital image; and control means for determining the number of levels of the sub-band encoding according to a size of the input digital image, wherein said control means executes control in such a manner that the number of levels of the sub-band encoding becomes larger in an image of a larger size than in an image of a smaller size.

26. An apparatus according to claim 25, having a first mode for inputting a digital image of a first size and a second mode for inputting an image of a size equal to ¼ of the first size, wherein said control means sets the number of levels of the sub-band encoding in the first mode larger by one in comparison with the number of levels of the sub-band encoding in the second mode, thereby matching the resolution of a lowest frequency band.

27. An apparatus according to claim 25, wherein said control means determines the number of levels of the sub-band encoding according to both the size of the input image and the resolution of the input image.

28. An image processing apparatus comprising:

encoding means for sub-band encoding an input digital image; and control means for determining a number of levels of the sub-band encoding according to the number of pixels of the input image, wherein said control means determines the number of levels of the sub-band encoding according to a fewer one of the number of pixels of the image in a vertical direction and that of the image in a horizontal direction.

29. An apparatus according to claim 28, wherein the sub-band encoding is a two-dimensional discrete wavelet transformation, and said control means limits the number of levels of the sub-band encoding in such a manner that the wavelet transformation coefficients obtained for each component are present by at least a predetermined number in a vertical direction and in a horizontal direction.

30. An apparatus according to claim 28, further comprising means for cropping the input image, wherein an image cropped by said cropping means is sub-band encoded by said encoding means.

31. An image processing method which comprises, in sub-band encoding an input digital image, determining a number of levels of the sub-band encoding according to the number of pixels of the image to be encoded, wherein the number of levels is determined according to a fewer one of the number of pixels of the image in a vertical direction and that of the image in a horizontal direction.

32. A method according to claim 31, wherein the sub-band encoding is a two-dimensional discrete wavelet transformation, and the number of levels of the sub-band encoding is limited in such a manner that the wavelet transformation coefficients obtained for each component are present by at least a predetermined number in a vertical direction and in a horizontal direction.

33. A method according to claim 31, wherein a photoelectrically converted image is rendered capable of cropping and the cropped image is sub-band encoded.

* * * * *

UNITED STATES PATENT AND TRADEMARK OFFICE
CERTIFICATE OF CORRECTION

PATENT NO. : 6,798,917 B2 Page 1 of 1
APPLICATION NO. : 09/767867
DATED : September 28, 2004
INVENTOR(S) : Fujiwara et al.

It is certified that error appears in the above-identified patent and that said Letters Patent is hereby corrected as shown below:

<u>COLUMN 11</u>:

Line 7, "2P4 P5)/8," should read --2P4-P5)/8,--.

Signed and Sealed this

Twenty-eighth Day of November, 2006

JON W. DUDAS
*Director of the United States Patent and Trademark Office*